(12) United States Patent
Nishigaki et al.

(10) Patent No.: US 7,125,384 B2
(45) Date of Patent: Oct. 24, 2006

(54) ULTRASONOGRAPH

(75) Inventors: Morio Nishigaki, Fujisawa (JP);
Yoshihiko Ito, Machida (JP); Takao Suzuki, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 109 days.

(21) Appl. No.: 10/504,564

(22) PCT Filed: Feb. 18, 2003

(86) PCT No.: PCT/JP03/01701

§ 371 (c)(1),
(2), (4) Date: Aug. 13, 2004

(87) PCT Pub. No.: WO03/068072

PCT Pub. Date: Aug. 21, 2003

(65) Prior Publication Data

US 2005/0165307 A1    Jul. 28, 2005

(30) Foreign Application Priority Data

Feb. 18, 2002  (JP)  ............................. 2002-040267

(51) Int. Cl.
*A61B 8/00* (2006.01)
*G01N 29/00* (2006.01)

(52) U.S. Cl. ........................................ 600/447; 73/626
(58) Field of Classification Search ........ 600/443–448, 600/454–456; 128/916; 73/625–626
See application file for complete search history.

(56) References Cited

U.S. PATENT DOCUMENTS

| | | | | |
|---|---|---|---|---|
| 4,180,792 A | * | 12/1979 | Lederman et al. .............. 367/7 |
| 4,448,075 A | * | 5/1984 | Takemura et al. ............ 73/626 |
| 4,638,467 A | * | 1/1987 | Takeuchi ..................... 367/105 |
| 4,962,667 A | * | 10/1990 | Ogawa et al. ................ 73/626 |
| 5,119,342 A | * | 6/1992 | Harrison, Jr. et al. ........... 367/7 |
| 5,375,470 A | * | 12/1994 | Matsushima et al. ......... 73/626 |
| 5,520,186 A | * | 5/1996 | Deitrich ....................... 600/437 |
| 5,575,290 A | * | 11/1996 | Teo et al. .................... 600/456 |
| 5,617,862 A | * | 4/1997 | Cole et al. ................... 600/459 |
| 5,740,806 A | * | 4/1998 | Miller ........................ 600/459 |
| 6,434,539 B1 | * | 8/2002 | Woodsum et al. ............. 706/13 |
| 6,436,047 B1 | * | 8/2002 | Ramamurthy et al. ...... 600/447 |

FOREIGN PATENT DOCUMENTS

| | | |
|---|---|---|
| JP | 58-70208 | 5/1983 |
| JP | 2000-152937 | 6/2000 |
| JP | 2000-157539 | 6/2000 |

* cited by examiner

*Primary Examiner*—Francis J. Jaworski
(74) *Attorney, Agent, or Firm*—Louis Woo

(57) ABSTRACT

An ultrasonic diagnostic apparatus is disclosed which can reduce the device amount of a receiving circuit, while obtaining the shape of an excellent received beam. In this ultrasonic diagnostic apparatus, a plurality of transducer elements are arrayed and used as an ultrasonic probe, and the transducer elements are driven by a plurality of transmission driving circuit. The signal received by the transducer element is distributed to any of a plurality of input terminals of a cross point switch beam former. The received signals of the three transducer elements near the center of the aperture of the ultrasonic probe are added and inputted to one terminal of a beam former. The second, fourth and sixth transducer elements at the end of the aperture are not connected to the beam former. The signals received by the transducer elements are delay-added by the beam former. The delay precision can be improved, and the beam shape can be made sharper, thereby improving the image quality of the ultrasonic image.

6 Claims, 25 Drawing Sheets

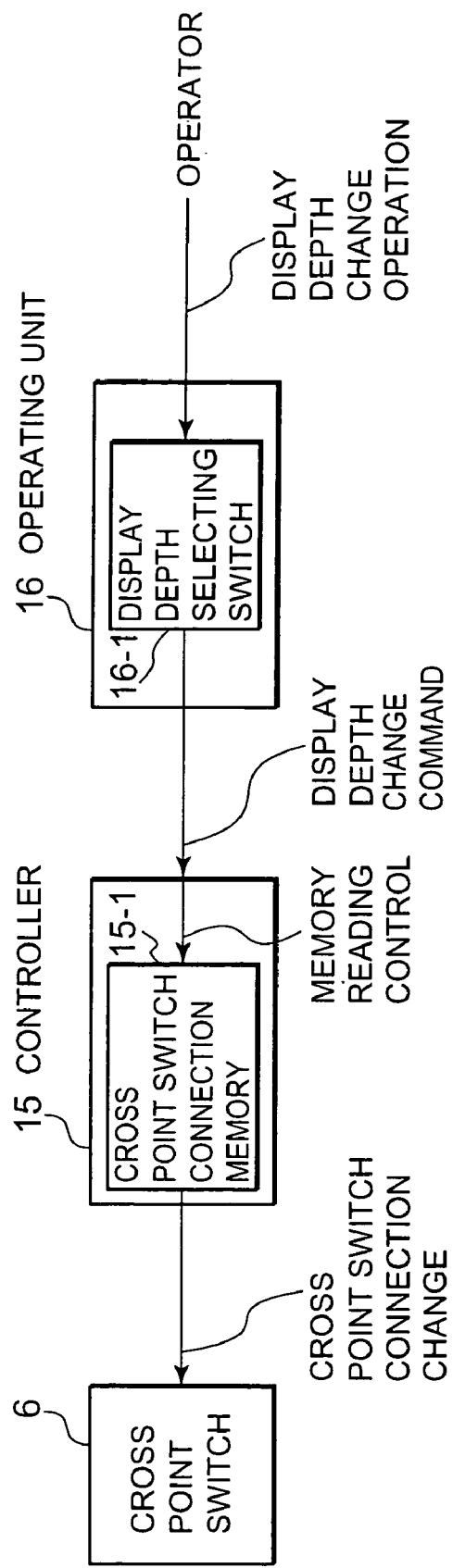

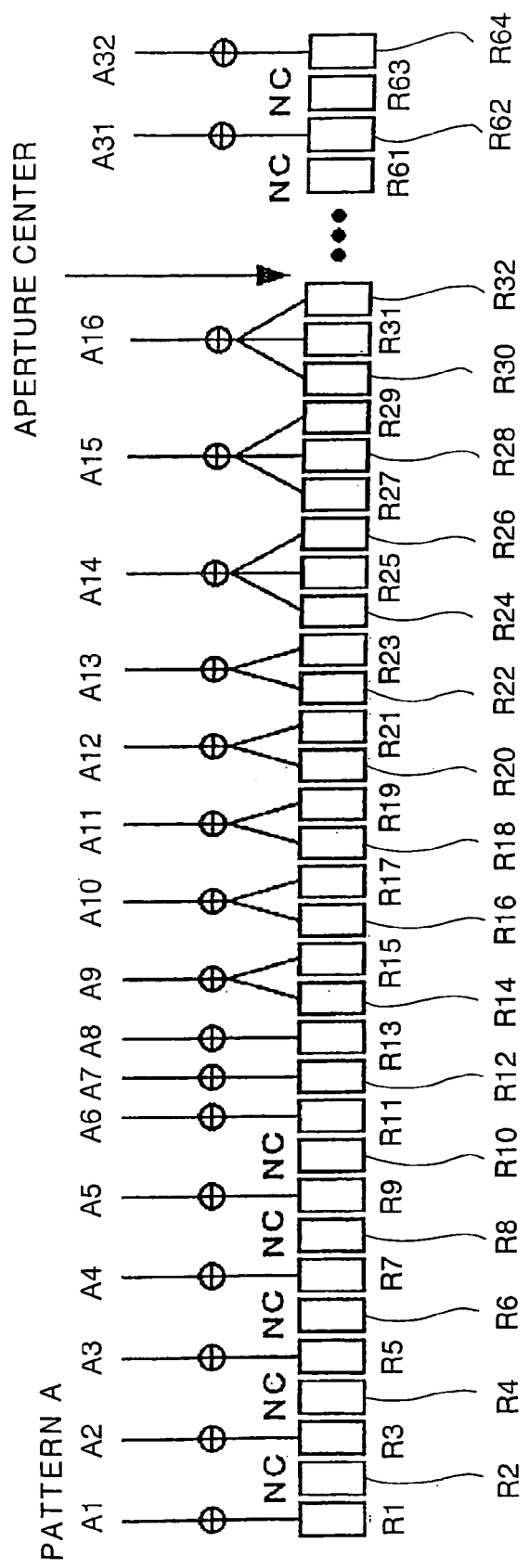

BEAM SHAPE OF TRANSMISSION

RECEIVED BEAM SHAPE

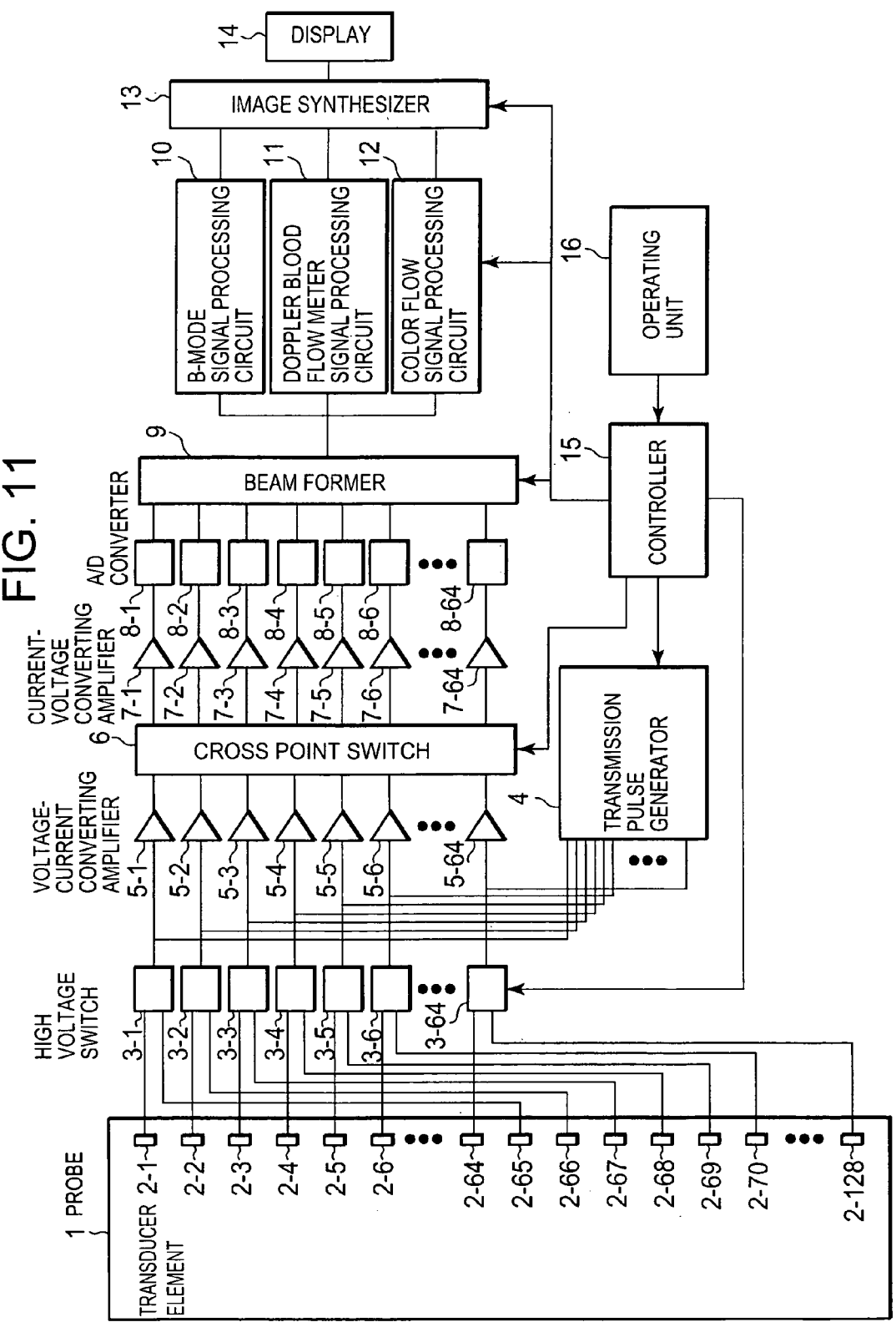

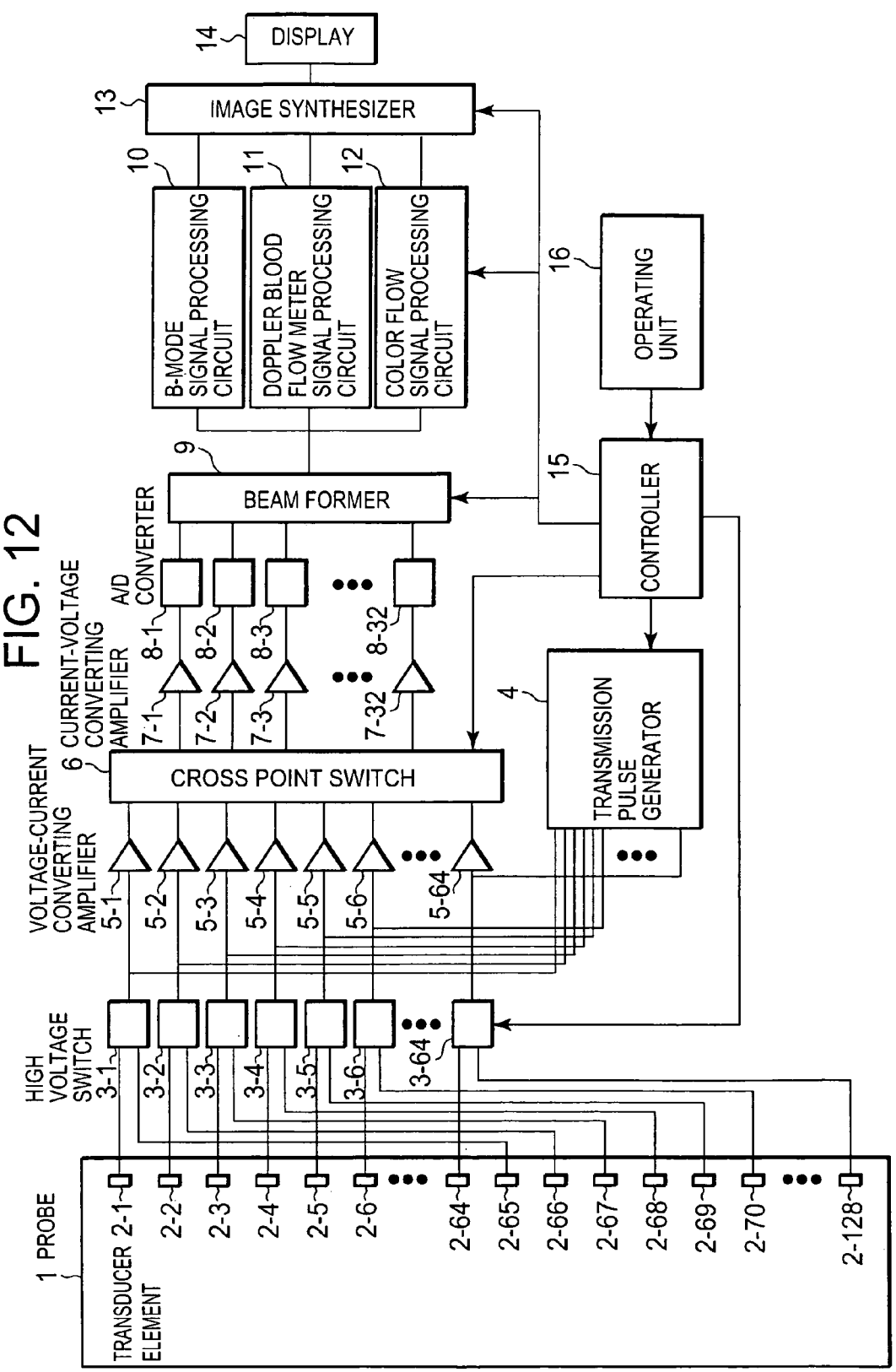

ULTRASONOGRAPH

TECHNICAL FIELD

The present invention relates to an ultrasonic diagnostic apparatus, and more particularly relates to an ultrasonic diagnostic apparatus for carrying out transmission/reception by using arrayed transducer elements.

BACKGROUND ART

Conventionally, in an ultrasonic diagnostic apparatus, a focusing technique has been used for using a plurality of arrayed transducer elements at the same time and focusing a beam. The configuration of such a conventional ultrasonic diagnostic apparatus will be described below. FIG. 11 shows a block diagram of a conventional linear scanning ultrasonic diagnostic apparatus (conventional example 1).

In FIG. 11, a probe 1 is an ultrasonic probe in which transducer elements 2-1 to 2-128 are arrayed. High voltage switches 3-1 to 3-64 are switches to select the apertures to be used. A transmission pulse generator 4 is a unit for generating a transmission pulse. A cross point switch 6 is a switch for re-arranging received signals. A/D converters 8-1 to 8-64 are units for converting analog received signals into digital signals. A beam former 9 is a unit for delaying and adding the data after the digital conversions. A B-mode signal processing circuit 10 is a unit for carrying out a signal process for a B-mode displaying. A Doppler blood flow meter signal processing circuit 11 is a unit for carrying out a signal process for a Doppler blood flow meter. A color flow signal processing circuit 12 is a unit for carrying out a signal process for a color flow. An image synthesizer 13 is a unit for synthesizing the signals from the respective signal processing circuits of the B-mode signal processing circuit 10 to the color flow signal processing circuit 12 and constituting a display image. A display 14 is a unit for displaying the synthesized image. A controller 15 is a unit for controlling the respective units of the ultrasonic diagnostic apparatus. An operating unit 16 is an inputting unit that is operated by an operator. Since the operations of the ultrasonic diagnostic apparatus configured in this way are well known, their explanations are omitted.

The ultrasonic diagnostic apparatus using the arrayed transducer elements needs to process the signals from the plurality of transducer elements at the same time, and consequently needs the A/D converters whose number is equal to the number of the transducer elements used at the same time, and the beam former for receiving the digitized signals and then carrying out the delaying and adding process. Thus, this has a problem that many devices are needed. In order to solve this, a method disclosed in Japanese Laid Open Utility Model Patent Application (JP-A-Showa, 58-70208) is proposed. This method will be described below by using FIG. 12 and FIG. 13.

FIG. 12 is a block diagram of the ultrasonic diagnostic apparatus (a conventional example 2) disclosed in Japanese Laid Open Utility Model Patent Application (JP-A-Showa, 58-70208). In FIG. 12, a probe 1 is an ultrasonic probe that includes arrayed transducer elements 2-1 to 2-128. High voltage switches 3-1 to 3-64 are switches to select the apertures to be used. A transmission pulse generator 4 is a unit for generating a transmission pulse. Voltage-current converting amplifiers 5-1 to 64 are units for converting voltages into currents. A cross point switch 6 is a switch for re-arranging received signals. Current-voltage converting amplifiers 7-1 to 32 are units for converting currents into voltages. A/D converters 8-1 to 8-32 are units for converting analog received signals into digital signals. A beam former 9 is a unit for delaying and adding the data after the digital conversion. A B-mode signal processing circuit 10 is a unit for carrying out a signal process for a B-mode displaying. A Doppler blood flow meter signal processing circuit 11 is a unit for carrying out a signal process for a Doppler blood flow meter. A color flow signal processing circuit 12 is a unit for carrying out a signal process for a color flow. An image synthesizer 13 is a unit for synthesizing the signals from the respective signal processing circuits of the B-mode signal processing circuit 10 to the color flow signal processing circuit 12 and constituting a display image. A display 14 is a unit for displaying the synthesized image. A controller 15 is a unit for controlling the respective units of the ultrasonic diagnostic apparatus. An operating unit 16 is an inputting unit that is operated by an operator.

The connection of the cross point switch 6 in this conventional example 2 is shown in FIG. 13A. Numbers 1, 2, . . . are assigned to the signals in the order starting from the ends of signal receiving apertures. In the cross point switch 6, two signals adjacent to each other are connected to one output terminal. At the former stage of the cross point switch, a received signal is converted into a current. Since the two signals are connected to the one output terminal, the output to which the current of the two signals is added can be taken out from the output terminal. Hereafter, the connection of the cross point switch 6 is represented as shown in FIG. 13B. In this way, the addition of the received signals of the two transducer elements adjacent to each other enables the drops in the input numbers of the A/D converters and beam formers, which consequently enables the reduction in the device amount.

However, even the addition for every two signals as mentioned above may bring about a problem. In the signal at the aperture end, the difference between the arrival times of the signals from the transducer elements adjacent to each other is great, which makes a delay precision poor. So, in order to solve this problem, in a conventional example 3 in which the conventional example 2 is improved, the addition of the transducer elements is not uniform. This method will be described below by using FIG. 14.

FIG. 14 is the connecting method of the cross point switch in the conventional example 3. In the conventional example 3, with the approach to the center of the aperture, the number of the received signals to be added is increased, and at the end, it is assumed to be 1. The fact that the difference of the delay time is small at the center of the aperture and the difference of the delay time is large at the end is considered.

However, in the conventional ultrasonic diagnostic apparatus, even in the above-mentioned conventional example 3, depending on the convergence condition, the difference of the delay time between the transducer elements to be added becomes great, which results in the problem that the convergence precision becomes poor.

DISCLOSURE OF THE INVENTION

It is therefore an object of the present invention to provide an ultrasonic diagnostic apparatus which solves those problems and attains a sharp beam shape by using a small quantity of receiving circuit configuration and has a high image quality.

In order to solve the above-mentioned problems, in the present invention, the ultrasonic diagnostic apparatus is designed so as to include: a plurality of transducer elements arrayed as an ultrasonic probe; a plurality of transmission driving circuits for driving the transducer elements; a beam former for delaying and adding the signals received by the transducer elements; a cross point switch for distributing the signals received by the transducer elements to any of a plurality of input terminals of the beam former; and a connection setting unit for setting the cross point switch so as to connect by integrating the received signals of the plurality of transducer elements near a center of an aperture of the ultrasonic probe and inputting to one terminal of the beam former and so as not to connect at least one of the transducer elements at an end of the aperture to the beam former.

Due to the above-mentioned configuration, it is possible to carry out the adjustment without connecting the received signals of the transducer elements at both ends of the aperture of the ultrasonic probe to the cross point switch, and possible to improve the delay precision of the received signal and consequently possible to improve the image quality.

Also, the connection setting unit includes: a unit for storing two or more connection pattern data between the transducer element and the beam former; a unit for selecting one of the connection pattern data in accordance with a selected display depth, transmission focus position or display mode; and a unit for setting the cross point switch in accordance with the selected connection pattern data. Due to such configuration, the delay precision can be improved on the basis of the display depth, the transmission focus position and the display mode.

Also, when at the time of the transmission, the two transducer elements adjacent to each other are driven by the same transmission pulse generating circuit, the side lobe direction in the transmission beam and the side lobe direction in the received beam can be separated, thereby making the total beam shape sharper.

BRIEF DESCRIPTION OF THE DRAWINGS

FIG. 2C is a block diagram of a control main section of the ultrasonic diagnostic apparatus in the second embodiment of the present invention;

FIG. 5A and FIG. 5B are explanation views showing a method of adding received signals by using a cross point switch, in an ultrasonic diagnostic apparatus in a fifth embodiment of the present invention;

FIG. 11 is a block diagram of an ultrasonic diagnostic apparatus (a conventional example 1) for carrying out a conventional sector scan;

FIG. 12 is a block diagram of an ultrasonic diagnostic apparatus (a conventional example 2) for carrying out a conventional sector scan;

BEST MODE FOR CARRYING OUT THE INVENTION

Embodiments of the present invention will be described below in detail with reference to FIG. 1 to FIG. 10

<First Embodiment>

The first embodiment of the present invention is the ultrasonic diagnostic apparatus, in which a cross point switch is set such that near the center of an aperture of an ultrasonic probe, received signals from 3 transducer elements are integrated into one and inputted to one terminal of a beam former, and at both ends of the aperture, 3 transducer elements which are placed every other transducer element are not connected to the beam former.

Figure 1:
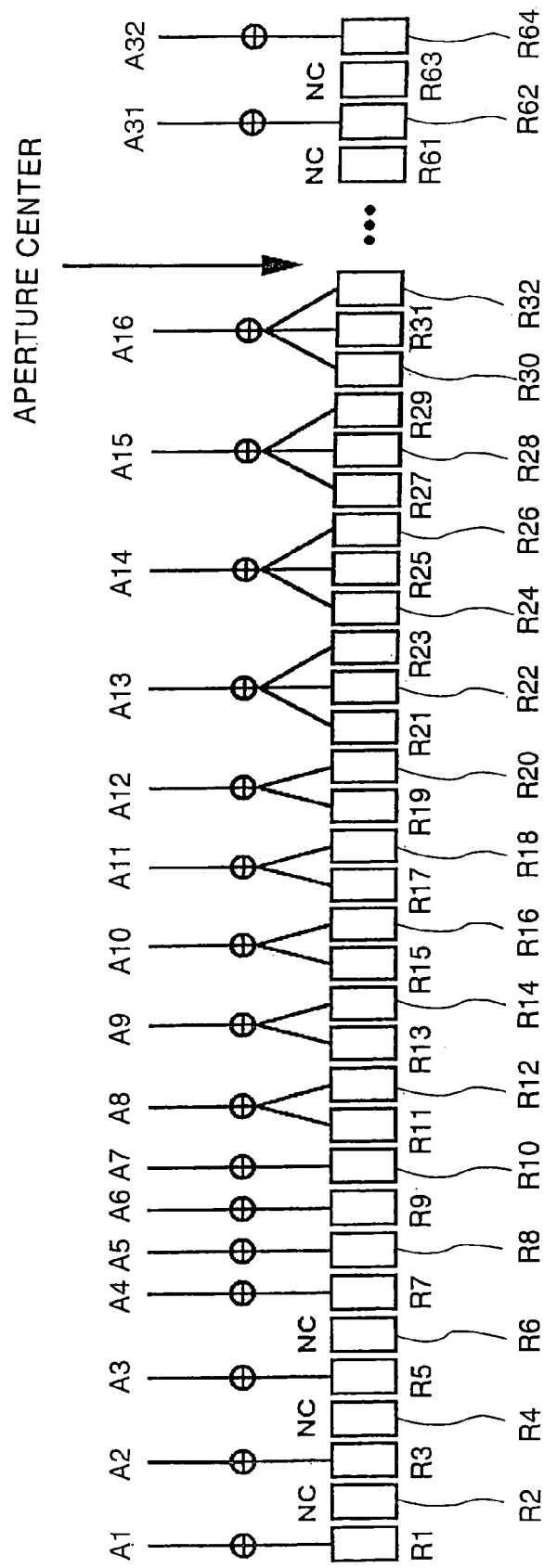
FIG. 1 is an explanation view showing a method of adding received signals by using a cross point switch, in an ultrasonic diagnostic apparatus in a first embodiment of the present invention.

FIG. 1 is an explanation view showing a method of adding the received signals by using the cross point switch, in the ultrasonic diagnostic apparatus in the first embodiment of the present invention. In FIG. 1, received signals R1 to R64 are the received signals from the transducer elements selected by high voltage switches, among the ultrasonic transducer elements arrayed in an ultrasonic probe to transmit and receive ultrasonic. Addition signals A1 to A32 are the signals as the results after the received signals are added by the cross point switch. The basic configuration of the ultrasonic diagnostic apparatus is equal to the conventional example 2 shown in FIG. 12.

The operations of the ultrasonic diagnostic apparatus in the first embodiment of the present invention configured as mentioned above will be described below. In order to determine the position, shape and the like of the aperture to be used as the ultrasonic probe, the high voltage switches are used to select 64 transducer elements from 128 transducer elements. The received signals from the selected transducer elements are indicated as the received signals R1 to R64. That is, they are indicated under the assumption that the transducer elements are arrayed in the manner of 2-1, 2-2, . . . , 2-64 from the left end of the aperture. The center of the aperture is located between the 32-th transducer element and the 33-th transducer element. The second, fourth, sixth, 59-th, 61-th and 63-th transducer elements at both ends are not used. Those received signals are added, as shown in FIG. 1, by the cross point switch, and defined as the addition signals A1 to A32. The processes on and after the processes in which the addition signals A1 to A32 are converted into the voltages by the current-voltage converting amplifiers, and converted into the digital signals by the A/D converters, and then delay-added by the beam former are equal to the conventional example 2.

Figure 14:
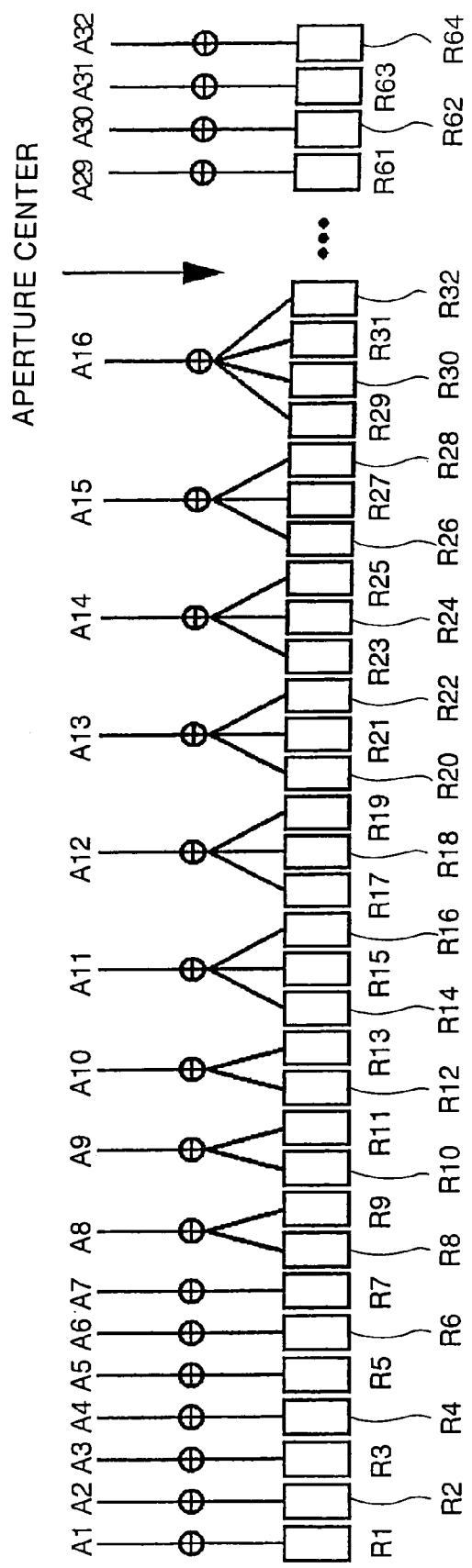
FIG. 14 is an explanation view showing a method of adding received signals by using a cross point switch, in an ultrasonic diagnostic apparatus (a conventional example 3) for carrying out the conventional sector scan.

In the transducer elements near the aperture center, the number of the transducer elements to be added is reduced from 4 to 3. At both the ends of the aperture, a total of 6 non-connected transducer elements are set every other transducer element. As compared with the conventional example 3 shown in FIG. 14, the number of the signals after the addition is equal, and the circuit amount of the signal process is not increased. The number of the signals at both the ends of the aperture in which the difference between the delay times of the received ultrasonic signals is great is decreased, and the number of the signals at the center of the aperture in which the difference between the delay times of the received ultrasonic signals is small is increased. Thus, the delay property of the received ultrasonic can be improved, thereby make the shape of the received ultrasonic beam sharper.

As mentioned above, in the first embodiment of the present invention, in the ultrasonic diagnostic apparatus, the cross point switch is set such that near the center of the aperture of the ultrasonic probe, the received signals from the 3 transducer elements are integrated into one and inputted to the one terminal of the beam former, and at both the ends of the aperture, the 3 transducer elements which are placed every other transducer element are not connected to the beam former. Thus, the delay property of the received ultrasonic is improved, and the beam shape is made sharper.

<Second Embodiment>

The second embodiment of the present invention is the ultrasonic diagnostic apparatus, which prepares two connection pattern data between the transducer element and the beam former, and selects the connection pattern data in accordance with a display depth, and then sets the cross point switch.

Figure 2A:
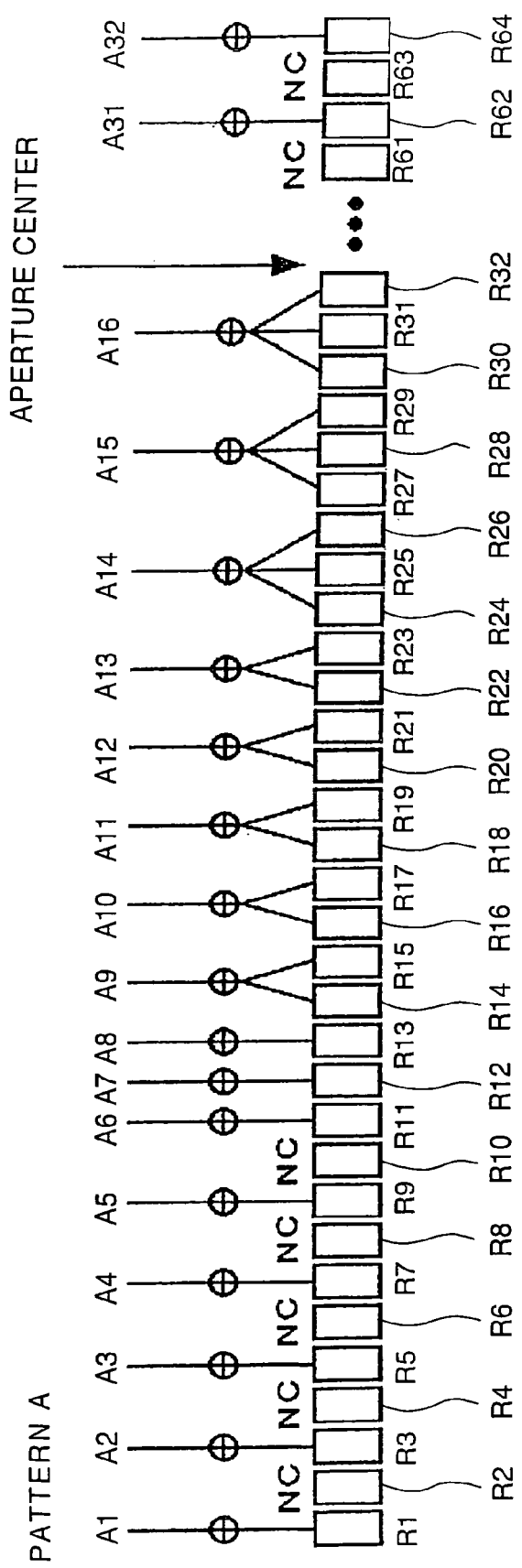
FIG. 2A and FIG. 2B are explanation views showing a method of adding received signals by using a cross point switch, in an ultrasonic diagnostic apparatus in a second embodiment of the present invention.
Figure 2B:
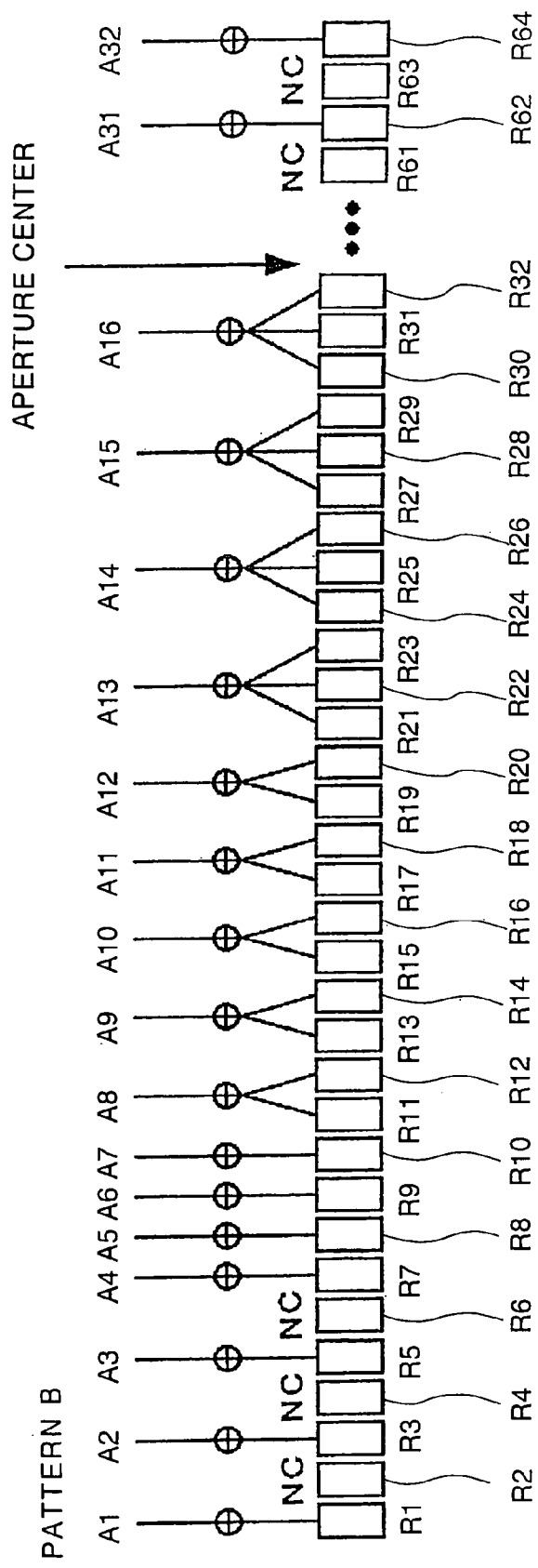

FIG. 2A, FIG. 2B and FIG. 2C are explanation views showing a method of adding the received signals, in the ultrasonic diagnostic apparatus in the second embodiment of the present invention. FIG. 2A is a pattern A using a first adding method. FIG. 2B is a pattern B using a second adding method. The meanings of the symbols in FIG. 2A and FIG. 2B are equal to FIG. 1. FIG. 2C is a block diagram showing an operating unit, a controller and the cross point switch in detail. In FIG. 2C, a cross point switch 6 is a switch to re-arrange the received signals. A controller 15 is a unit for controlling the respective units of the ultrasonic diagnostic apparatus. A cross point switch connection memory 15-1 is a memory for storing the connection pattern data. The operating unit 16 is the inputting unit which is operated by an operator. A display depth selecting switch 16-1 is a switch to select the display depth desired by the operator. The other basic configurations of the ultrasonic diagnostic apparatus are equal to the conventional example 2 shown in FIG. 12.

The operations of the ultrasonic diagnostic apparatus in the second embodiment of the present invention configured as mentioned above will be described below. As the patterns of the method in which the received signals are added by the cross point switch, the pattern A shown in FIG. 2A and the pattern B shown in FIG. 2B are prepared. The pattern A has more transducer elements which are not used at the end, and it is suitable for the reception in a relatively shallow portion. If three or more patterns are prepared, it is possible to cope with the desired depth in detail.

As shown in FIG. 2C, the display depth selecting switch 16-1 is placed in the operating unit 16. The cross point switch connection memory 15-1 is placed in the controller 15. When the operator operates the display depth selecting switch 16-1 and a display depth change command is inputted to the controller 15, the pattern data corresponding to the display depth is read from the cross point switch connection memory 15-1. The read pattern data is transmitted, as the information to change the connection of the cross point switch, to the cross point switch 6, and the connection of the cross point switch 6 is changed.

The received signals are added by the cross point switch in accordance with the changed connection and defined as the addition signals A1 to A32. The processes on and after the processes in which the addition signals A1 to A32 are converted into the voltages by the current-voltage converting amplifiers, and converted into the digital signals by the A/D converters, and then delay-added by the beam former are equal to the conventional example 2.

If the operator desires the displaying of the shallow depth, the display depth selecting switch 16-1 is used to select the shallow depth. The display depth change command is outputted from the operating unit 16, and the data of the pattern A corresponding to the shallow depth is read from the cross point switch connection memory 15-1 of the controller 15. The connection of the cross point switch 6 is changed in accordance with the data of the pattern A. The received signals are added by the cross point switch in accordance with the changed connection, and delay-added by the beam former, and a predetermined operating process is performed. Then, it is displayed as a picture. If the operator desires the deep depth, the connection of the cross point switch 6 is changed in accordance with the data of the pattern B, and the picture having the high precision of the deep depth is displayed.

As mentioned above, in the second embodiment of the present invention, the ultrasonic diagnostic apparatus is designed such that the two connection pattern data between the transducer element and the beam former are prepared, and the connection pattern data is selected in accordance with the display depth, and the cross point switch is set. Thus, correspondingly to the display depth, the pattern of the adding method of the received signals can be changed, thereby obtaining the optimal image.

<Third Embodiment>

The third embodiment of the present invention is the ultrasonic diagnostic apparatus, which prepares the two connection pattern data between the transducer element and the beam former, and selects the connection pattern data in accordance with a selected transmission focus position, and then sets the cross point switch.

Figure 3A:
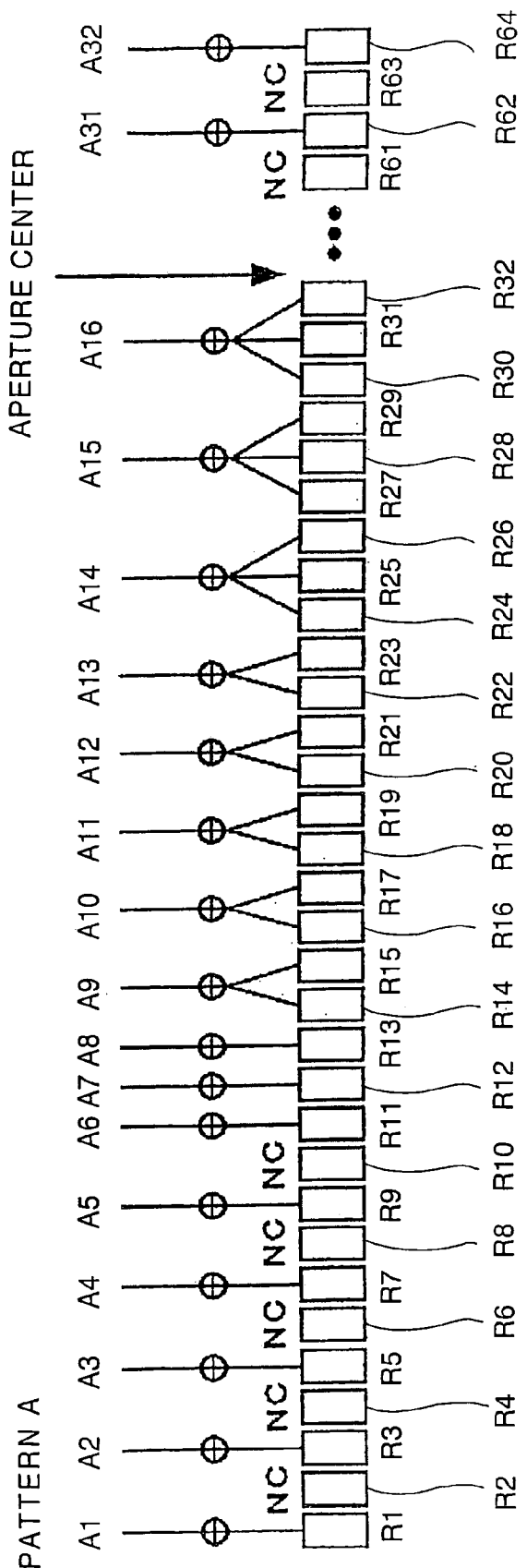
FIG. 3A and FIG. 3B are explanation views showing a method of adding received signals by using a cross point switch, in an ultrasonic diagnostic apparatus in a third embodiment of the present invention.
Figure 3B:
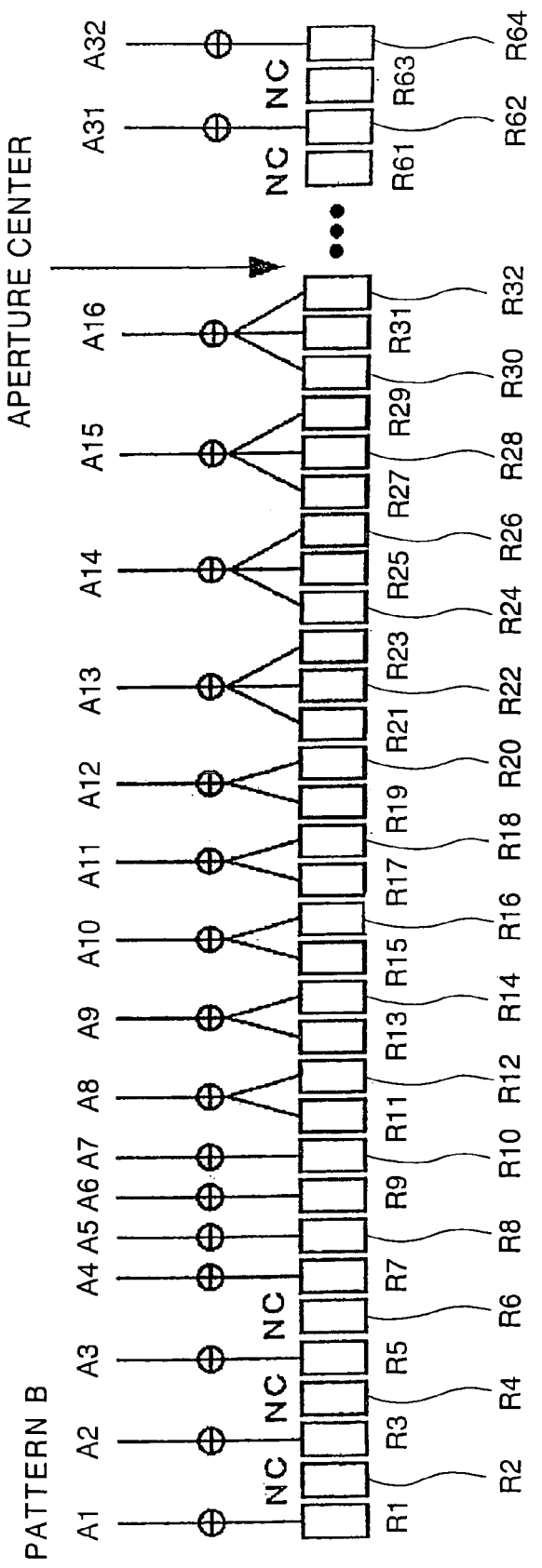
Figure 3C:
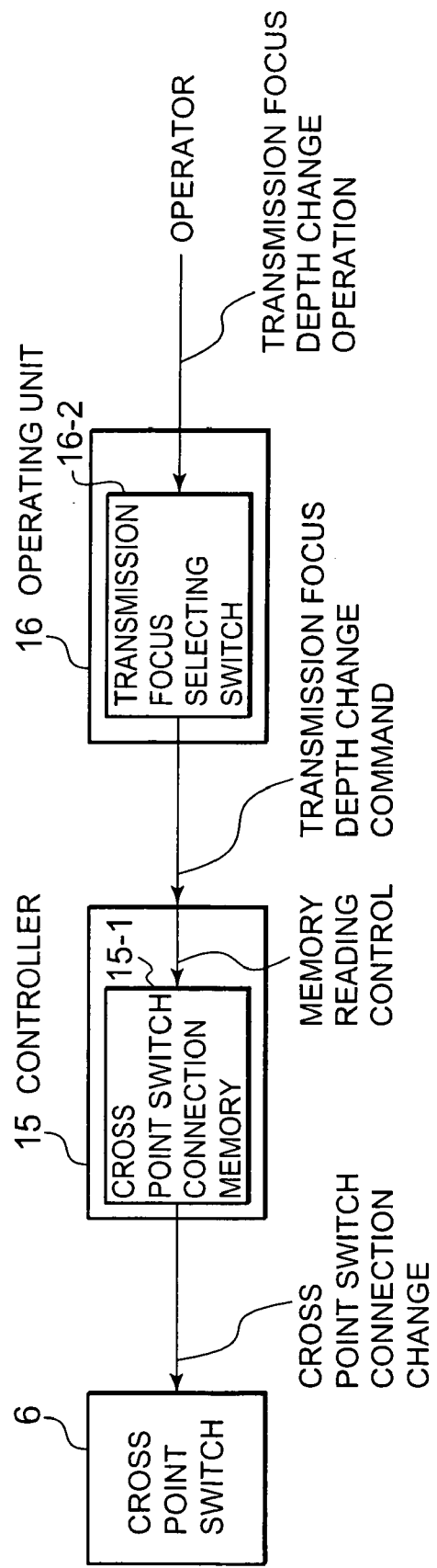
FIG. 3C is a block diagram of a control main section of the ultrasonic diagnostic apparatus in the third embodiment of the present invention.

FIG. 3A, FIG. 3B and FIG. 3C are explanation views showing a method of adding the received signals, in the ultrasonic diagnostic apparatus in the third embodiment of the present invention. FIG. 3A is the pattern A using the first adding method. FIG. 3B is the pattern B using the second adding method. The meanings of the symbols in FIG. 3A and FIG. 3B are equal to FIG. 1. FIG. 3C is a block diagram showing the operating unit, the controller and the cross point switch in detail. In FIG. 3C, the cross point switch 6 is the switch to re-arrange the received signals. The controller 15 is the unit for controlling the respective units of the ultrasonic diagnostic apparatus. The cross point switch connection memory 15-1 is the memory for storing the connection pattern data. The operating unit 16 is the inputting unit which is operated by the operator. A transmission focus selecting switch 16-2 is a switch to select an adding method pattern of the received signals on the basis of a transmission focus depth. The other basic configurations of the ultrasonic diagnostic apparatus are equal to the conventional example 2 shown in FIG. 12.

The operations of the ultrasonic diagnostic apparatus in the third embodiment of the present invention configured as mentioned above will be described below. As the patterns of the method in which the received signals are added by the cross point switch, the pattern A shown in FIG. 3A and the pattern B shown in FIG. 3B are prepared. Since the pattern A has the more transducer elements which are not used at the end, the beam shape when the aperture is small at the relatively shallow portion is excellent. If three or more patterns are prepared, it is possible to cope with the transmission focus depth in detail.

As shown in FIG. 3C, the transmission focus selecting switch 16-2 is placed in the operating unit 16. The cross point switch connection memory 15-1 is placed in the controller 15. When the operator operates the transmission focus selecting switch 16-2 and a transmission focus depth change command is inputted to the controller 15, a read content of the cross point switch connection memory 15-1 is changed. The information to change the connection of the cross point switch is transmitted to the cross point switch 6, and the connection of the cross point switch 6 is changed.

The received signals are added by the cross point switch in accordance with the changed connection and defined as the addition signals A1 to A32. The processes on and after the processes in which the addition signals A1 to A32 are converted into the voltages by the current-voltage converting amplifiers, and converted into the digital signals by the A/D converters, and then delay-added by the beam former are equal to the conventional example 2.

If the transmission focus is located at a shallow portion, the beam shape of the shallow portion is excellent. Thus, when the receiving beam is considered totally with regard to the transmission/reception, even if the shallow portion has many side lobes, the side lobes become few. Reversely, if the transmission focus is deep, the transmission focus is not excellent at the shallow portion. Hence, it is necessary to improve the shape of the receiving beam and prevent the deterioration in the beam shape of the transmission/reception.

If the transmission focus is located at a deep portion, the transmission focus selecting switch 16-2 is used to select the deep transmission focus depth. The transmission focus depth change command is outputted from the operating unit 16, and the data of the pattern A corresponding to the deep transmission focus depth is read from the cross point switch connection memory 15-1 of the controller 15. The connection of the cross point switch 6 is changed in accordance with the data of the pattern A. The received signals are added by the cross point switch in accordance with the changed connection, and delay-added by the beam former, and a predetermined operating process is performed. Then, it is displayed as a picture. If the operator selects the shallow transmission focus depth, the connection of the cross point switch 6 is changed in accordance with the data of the pattern B, and the picture having the high precision as a whole is displayed.

As mentioned above, in the third embodiment of the present invention, the ultrasonic diagnostic apparatus is designed such that the two connection pattern data between the transducer element and the beam former are prepared, and the connection pattern data is selected in accordance with the selected transmission focus position, and the cross point switch is set. Thus, correspondingly to the transmission focus depth, the pattern of the adding method of the received signals can be changed, thereby obtaining the optimal image as a whole.

<Fourth Embodiment>

The fourth embodiment of the present invention is the ultrasonic diagnostic apparatus, which prepares the two connection pattern data between the transducer element and the beam former, and selects the connection pattern data in accordance with a selected display mode, and then sets the cross point switch.

Figure 4A:
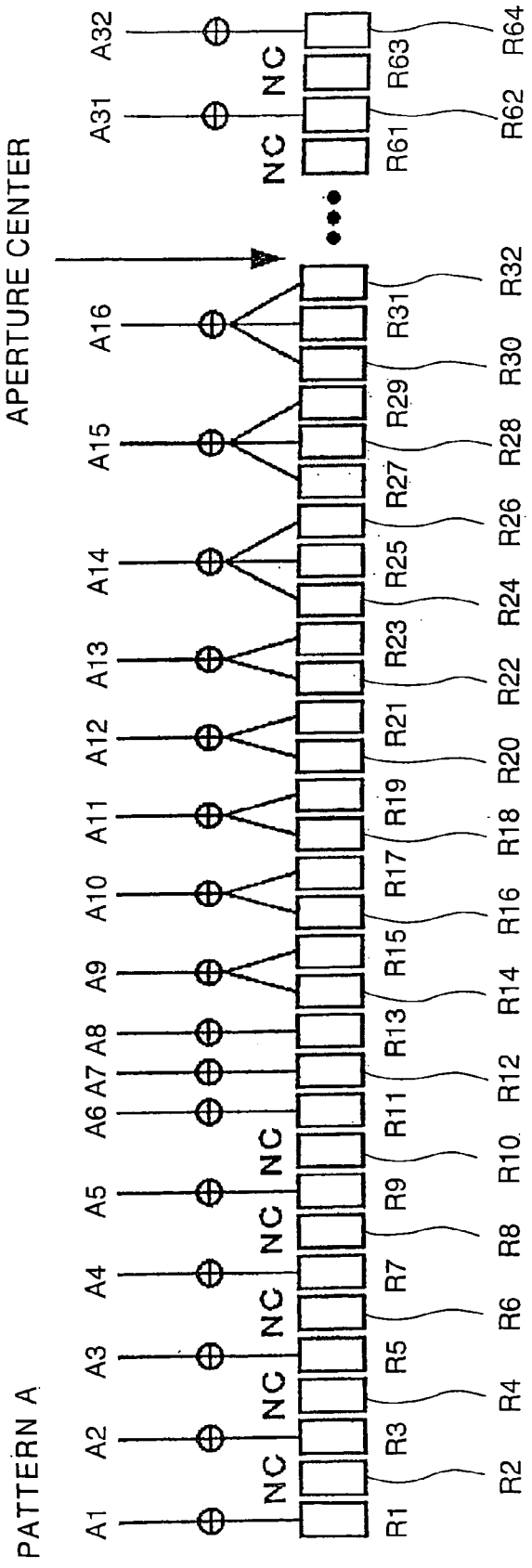
FIG. 4A and FIG. 4B are explanation views showing a method of adding received signals by using a cross point switch, in an ultrasonic diagnostic apparatus in a fourth embodiment of the present invention.
Figure 4B:
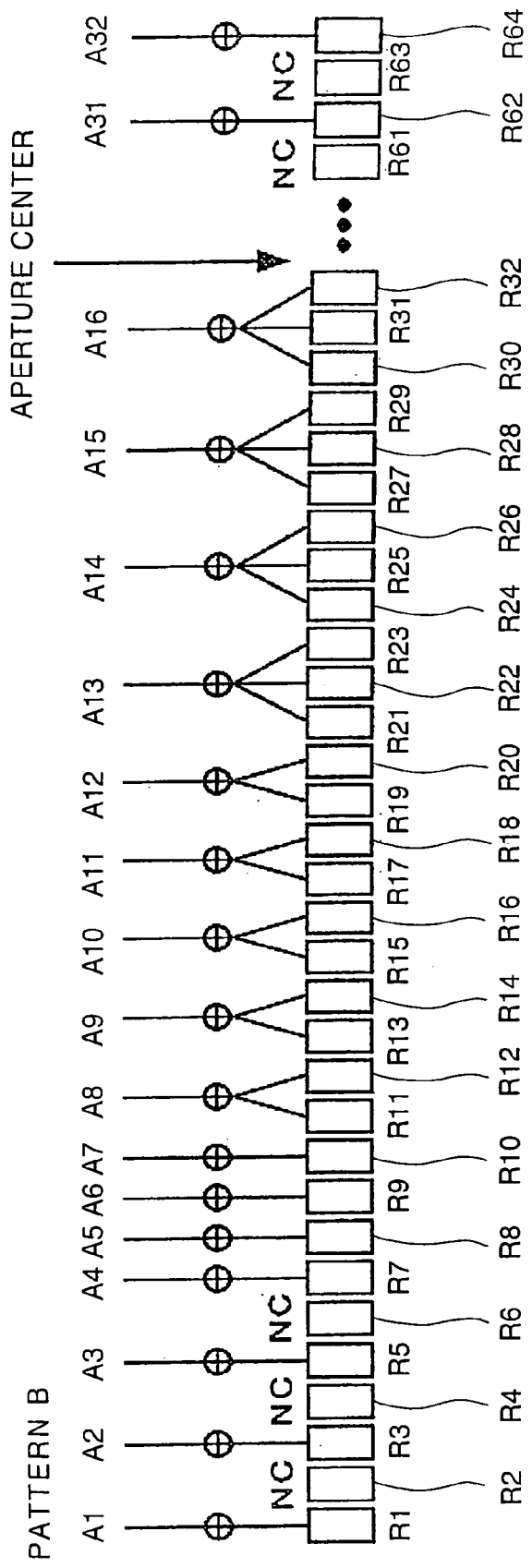
Figure 4C:
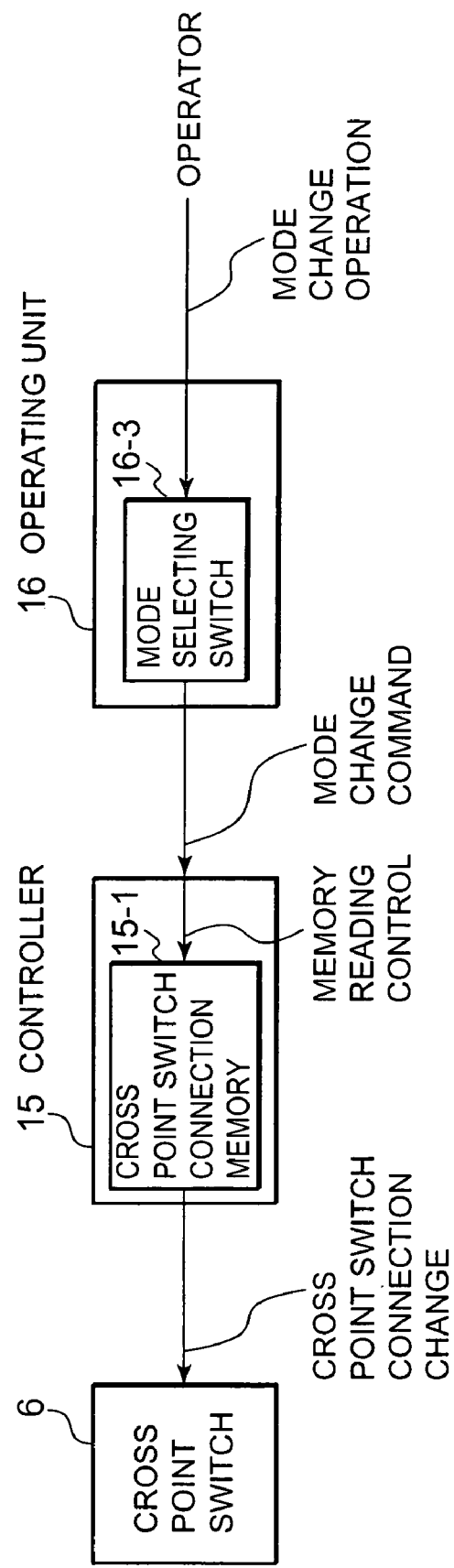
FIG. 4C is a block diagram of a control main section of the ultrasonic diagnostic apparatus in the fourth embodiment of the present invention.

FIG. 4A, FIG. 4B and FIG. 4C are explanation views showing a method of adding the received signals, in the ultrasonic diagnostic apparatus in the fourth embodiment of the present invention. FIG. 4A is the pattern A using the first adding method. FIG. 4B is the pattern B using the second adding method. The meanings of the symbols in FIG. 4A and FIG. 4B are equal to FIG. 1. FIG. 4C is a block diagram showing the operating unit, the controller and the cross point switch in detail. In FIG. 4C, the cross point switch 6 is the switch to re-arrange the received signals. The controller 15 is the unit for controlling the respective units of the ultrasonic diagnostic apparatus. The cross point switch connection memory 15-1 is the memory for storing the connection pattern data. The operating unit 16 is the inputting unit which is operated by the operator. A mode selecting switch 16-3 is a switch to select an adding method pattern of the received signals on the basis of the display mode. The other basic configurations of the ultrasonic diagnostic apparatus are equal to the conventional example 2 shown in FIG. 12.

The operations of the ultrasonic diagnostic apparatus in the fourth embodiment of the present invention configured as mentioned above will be described below. As the patterns of the method in which the received signals are added by the cross point switch, the pattern A shown in FIG. 4A and the pattern B shown in FIG. 4B are prepared. The pattern A has the fewer side lobes when the aperture is fully used, and the omission of an image is excellent. On the other hand, the pattern B has the fewer transducer elements which are not used at the end, and it is advantageous with respect to the sensibility. Thus, at a B-mode in which the excellent omission is required, the usage of the pattern A is preferable. At the Doppler blood flow meter mode and color flow mode in which the sensibility is required, the usage of the pattern B is preferable. If three or more patterns are prepared, it is possible to cope with the various modes in detail.

As shown in FIG. 4C, the mode selecting switch 16-3 is placed in the operating unit 16. The cross point switch connection memory 15-1 is placed in the controller 15. When the operator operates the mode selecting switch 16-3 and a mode change command is inputted to the controller 15, the read content of the cross point switch connection memory is changed. The information to change the connection of the cross point switch is transmitted to the cross point switch 6, and the connection of the cross point switch 6 is changed.

The received signals are added by the cross point switch in accordance with the changed connection and defined as the addition signals A1 to A32. The processes on and after the processes in which the addition signals A1 to A32 are converted into the voltages by the current-voltage converting amplifiers, and converted into the digital signals by the A/D converters, and then delay-added by the beam former are equal to the conventional example 2.

If the operator desires the displaying of the B-mode, the mode selecting switch 16-1 is used to select the B-mode. The mode change command is outputted from the operating unit 16, and the data of the pattern A corresponding to the B-mode is read from the cross point switch connection memory 15-1 of the controller 15. The connection of the cross point switch 6 is changed in accordance with the data of the pattern A. The received signals are added by the cross point switch in accordance with the changed connection, and delay-added by the beam former, and a predetermined operating process is performed. Then, it is displayed as a picture. If the operator selects the Doppler blood flow meter mode and the color flow mode, the connection of the cross point switch 6 is changed in accordance with the data of the pattern B, and the picture having the high precision is displayed.

As mentioned above, in the fourth embodiment of the present invention, the ultrasonic diagnostic apparatus is designed such that the two connection pattern data between the transducer element and the beam former are prepared, and the connection pattern data is selected in accordance with the selected display mode, and the cross point switch is set. Thus, it is possible to select the pattern of the adding method which corresponds to each of the signal processing modes, and possible to obtain the optimal image.

<Fifth Embodiment>

The fifth embodiment of the present invention is the ultrasonic diagnostic apparatus, which prepares the two connection pattern data between the transducer element and the beam former, and selects the connection pattern data in accordance with the priority of a selected main/side lobe, and then sets the cross point switch.

Figure 5B:
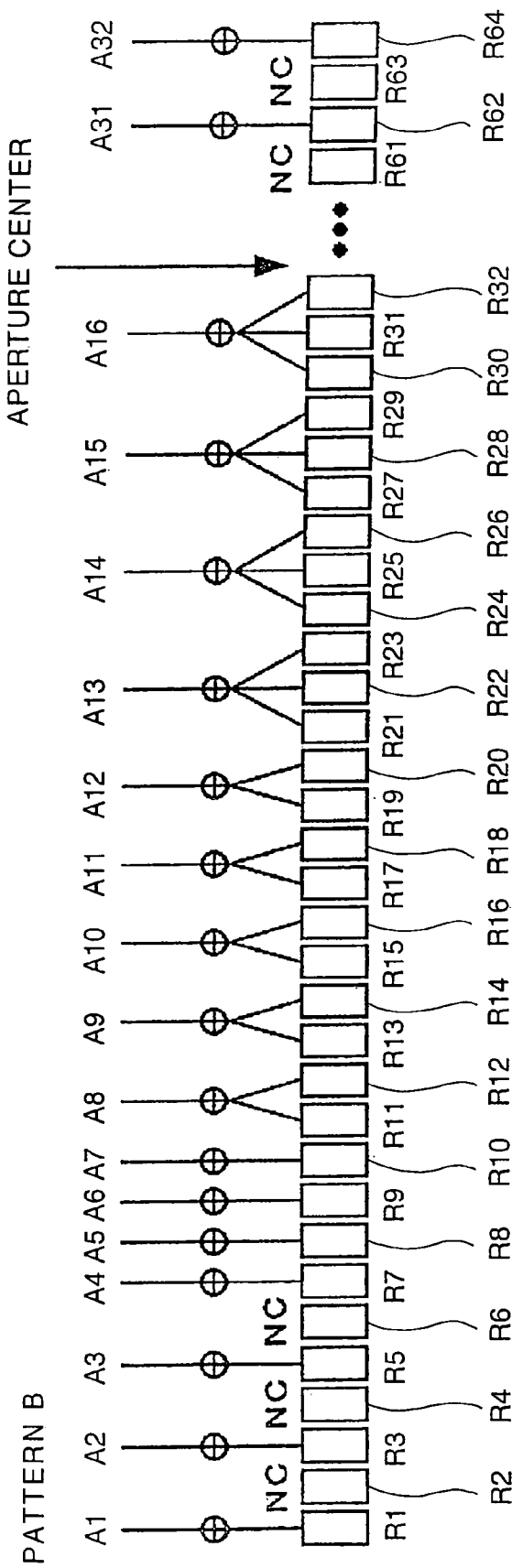
Figure 5C:
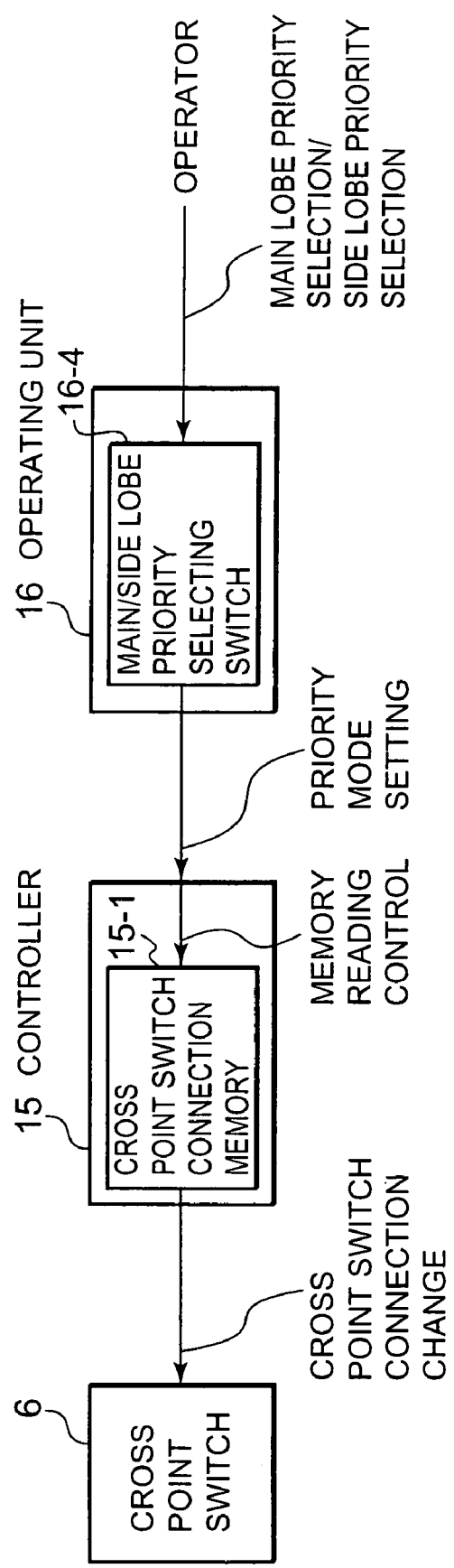
FIG. 5C is a block diagram of a control main section of the ultrasonic diagnostic apparatus in the fifth embodiment of the present invention.

FIG. 5A, FIG. 5B and FIG. 5C are explanation views showing a method of adding the received signals, in the ultrasonic diagnostic apparatus in the fifth embodiment of the present invention. FIG. 5A is the pattern A using the first adding method. FIG. 5B is the pattern B using the second adding method. The meanings of the symbols in FIG. 5A and FIG. 5B are equal to FIG. 1. FIG. 5C is a block diagram showing the operating unit, the controller and the cross point switch in detail. In FIG. 5C, the cross point switch 6 is the switch to re-arrange the received signals. The controller 15 is the unit for controlling the respective units of the ultrasonic diagnostic apparatus. The cross point switch connection memory 15-1 is the memory for storing the connection pattern data. The operating unit 16 is the inputting unit which is operated by the operator. A main/side lobe priority selecting switch 16-4 is a switch to select an adding method pattern of the received signals on the basis of the side lobe to which the priority is assigned. The other basic configurations of the ultrasonic diagnostic apparatus are equal to the conventional example 2 shown in FIG. 12.

The operations of the ultrasonic diagnostic apparatus in the fifth embodiment of the present invention configured as mentioned above will be described below. As the patterns of the method in which the received signals are added by the cross point switch, the pattern A shown in FIG. 5A and the pattern B shown in FIG. 5B are prepared. The pattern A has the fewer side lobes when the aperture is fully used, and the omission of the image is excellent. On the other hand, the pattern B has the fewer transducer elements which are not used at the end, and the main lobe is slim. Thus, in accordance with the wish of the operator, it is possible to carry out the proper usage selection, such as the selection of the pattern A if the excellent omission is desired or the selection of the pattern B if the excellent resolution is desired. If three or more patterns are prepared, it is possible to cope with the request of the image quality in detail.

As shown in FIG. 5C, the main/side lobe priority selecting switch 16-4 is placed in the operating unit 16. The cross point switch connection memory 15-1 is placed in the controller 15. When the operator operates the main/side lobe priority selecting switch 16-4 and a priority mode set command is inputted to the controller 15, the read content of the cross point switch connection memory is changed. The information to change the connection of the cross point switch is transmitted to the cross point switch 6, and the connection of the cross point switch 6 is changed.

The received signals are added by the cross point switch in accordance with the changed connection and defined as the addition signals A1 to A32. The processes on and after the processes in which the addition signals A1 to A32 are converted into the voltages by the current-voltage converting amplifiers, and converted into the digital signals by the A/D converters, and then delay-added by the beam former are equal to the conventional example 2.

If the operator desires the displaying of the excellent omission, the mode selecting switch 16-1 is used to select the side lobe priority. The priority mode set command is outputted from the operating unit 16, and the data of the pattern A corresponding to the side lobe priority is read from the cross point switch connection memory 15-1 of the controller 15. The connection of the cross point switch 6 is changed in accordance with the data of the pattern A. The received signals are added by the cross point switch in accordance with the changed connection, and delay-added by the beam former, and a predetermined operating process is performed. Then, it is displayed as a picture. If the operator desires the displaying of the excellent resolution, when the main lobe priority is selected, the connection of the cross point switch 6 is changed in accordance with the data of the pattern B, and the picture having the high resolution is displayed.

As mentioned above, in the fifth embodiment of the present invention, the ultrasonic diagnostic apparatus is designed such that the two connection pattern data between the transducer element and the beam former are prepared, and the connection pattern data is selected in accordance with the priority of the selected main/side lobe, and the cross point switch is set. Thus, it is possible to select the pattern of the adding method of the received signals, on the basis of the image quality along the wish of the operator, and possible to obtain the optimal image.

<Sixth Embodiment>

The sixth embodiment of the present invention is the ultrasonic diagnostic apparatus, which prepares the two connection pattern data between the transducer element and the beam former, and while switching the transmission focus position, repeats the transmission/reception in the same direction a plurality of times, and when extracting and synthesizing the images of shallow portion and deep portion, selects the connection pattern data in accordance with a shallow portion image extraction sequence or deep portion image extraction sequence, and then sets the cross point switch.

Figure 6A:
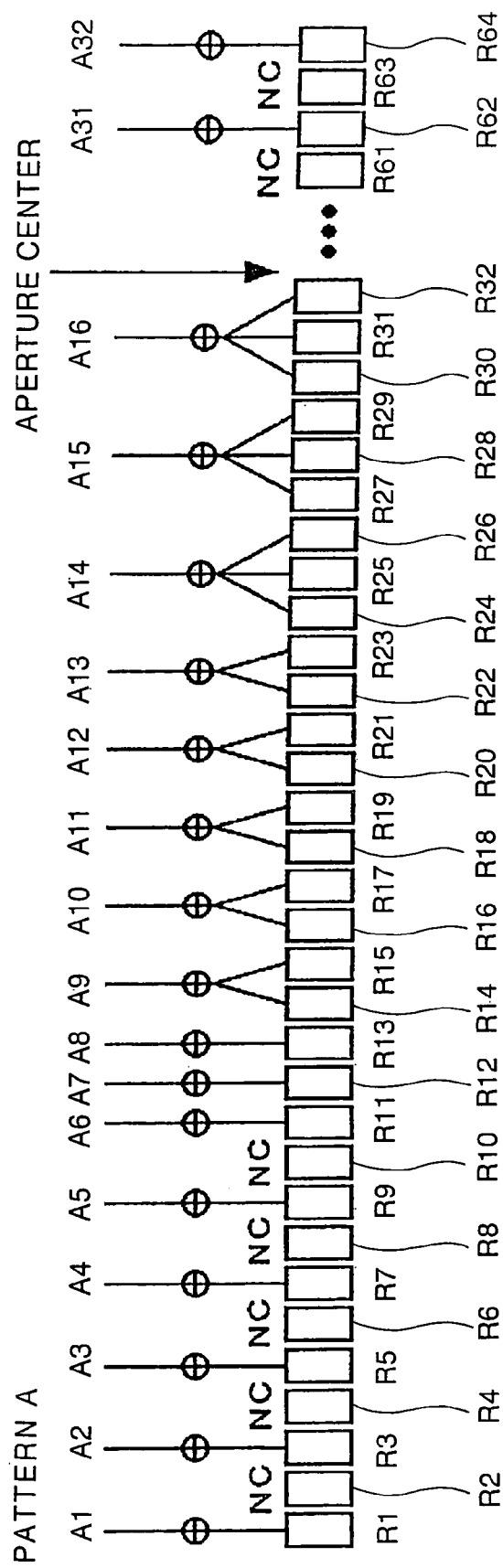
FIG. 6A and FIG. 6B are explanation views showing a method of adding received signals by using a cross point switch, in an ultrasonic diagnostic apparatus in a sixth embodiment of the present invention.
Figure 6B:
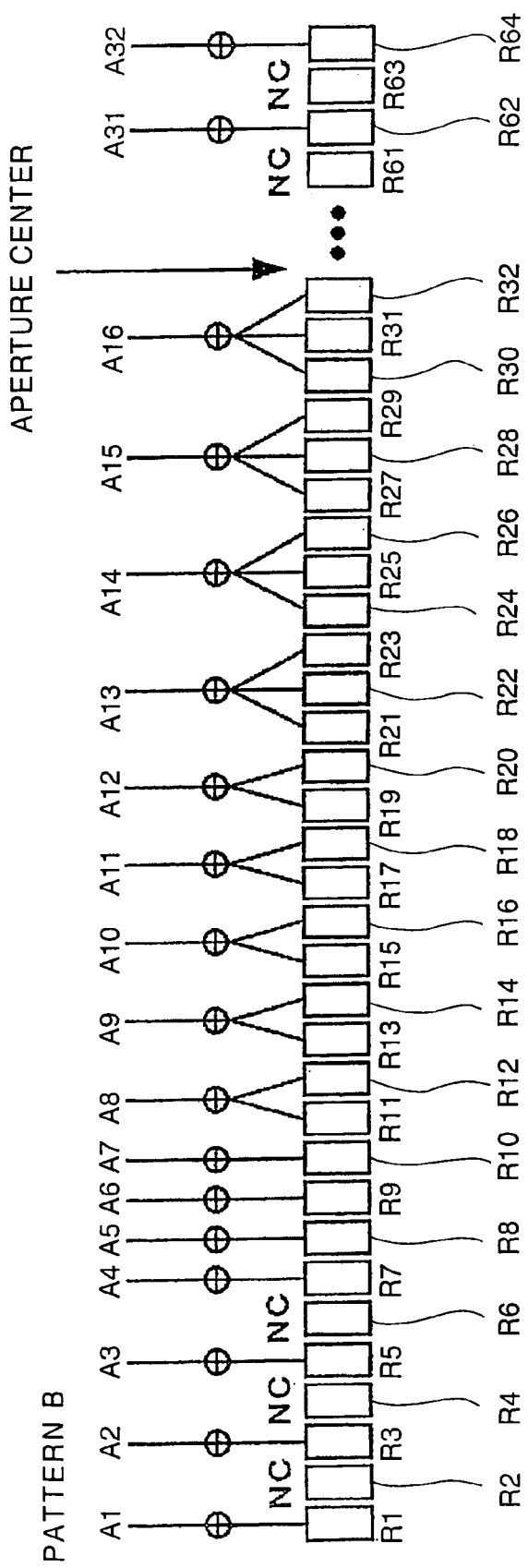
Figure 6C:
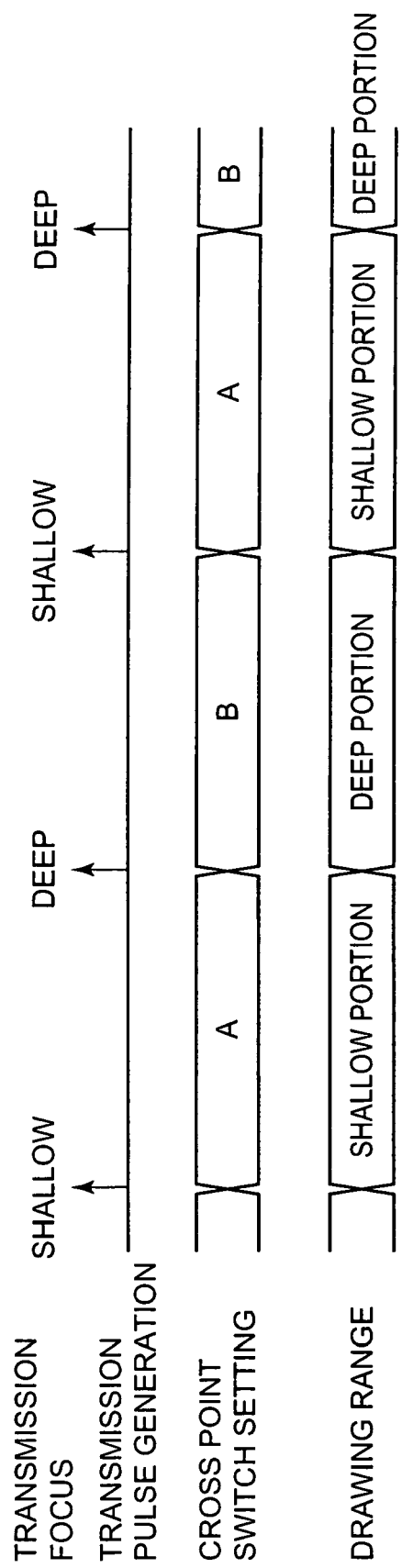
FIG. 6C is a block diagram of a control main section of the ultrasonic diagnostic apparatus in the sixth embodiment of the present invention.

FIG. 6A, FIG. 6B and FIG. 6C are explanation views showing a method of adding the received signals, in the ultrasonic diagnostic apparatus in the sixth embodiment of the present invention. FIG. 6A is the pattern A using the first adding method. FIG. 6B is the pattern B using the second adding method. The meanings of the symbols in FIG. 6A and FIG. 6B are equal to FIG. 1. FIG. 6C is a view showing the timings of the sequences.

The operations of the ultrasonic diagnostic apparatus in the sixth embodiment of the present invention configured as mentioned above will be described below. As the patterns of the method in which the received signals are added by the cross point switch, the pattern A shown in FIG. 6A and the pattern B shown in FIG. 6B are prepared. Since the pattern A has the more transducer elements which are not used at the end, the beam shape when the aperture is small at the relatively shallow portion is excellent. On the other hand, since the pattern B has the fewer transducer elements which are not used at the end and has the excellent sensibility, it is suited to view the deep portion. If three or more patterns are prepared, it is possible to cope with the various sequences in detail.

In the ultrasonic diagnostic apparatus, there is a function of changing the transmission focus in the same direction, carrying out the transmission/reception a plurality of times, and synthesizing the images and consequently obtaining the image with the excellent resolution from the shallow portion to the deep portion. In this function, by switching between the usage of the pattern A in the signal obtaining sequence for the shallow portion and the usage of the pattern B in the signal obtaining sequence for the deep portion, it is possible to consequently obtain the excellent image in any one of both the depths.

As shown in the timing chart of the sequence in FIG. 6C, in the sequence at which the transmission focus is shallow, the connection of the cross point switch is set at the pattern A, and the image data of the shallow portion is obtained. In the sequence at which the transmission focus is deep, the connection of the cross point switch is set at the pattern B, and the image data of the deep portion is obtained. Consequently, it is possible to obtain the picture having the excellent image quality from the shallow portion to the deep portion.

As mentioned above, in the sixth embodiment of the present invention, the ultrasonic diagnostic apparatus is designed such that the two connection pattern data between the transducer element and the beam former are prepared, and when while the transmission focus position is switched, the transmission/reception is repeated in the same direction the plurality of times, and the images of the shallow portion and deep portion are extracted and synthesized, the connection pattern data is selected in accordance with the shallow portion image extraction sequence or deep portion image extraction sequence, and the cross point switch is set. Thus, it is possible to obtain the optimal image as a whole.

<Seventh Embodiment>

The seventh embodiment of the present invention is the ultrasonic diagnostic apparatus for changing the size of the aperture of the probe and the like, on the basis of the display depth.

Figure 7:
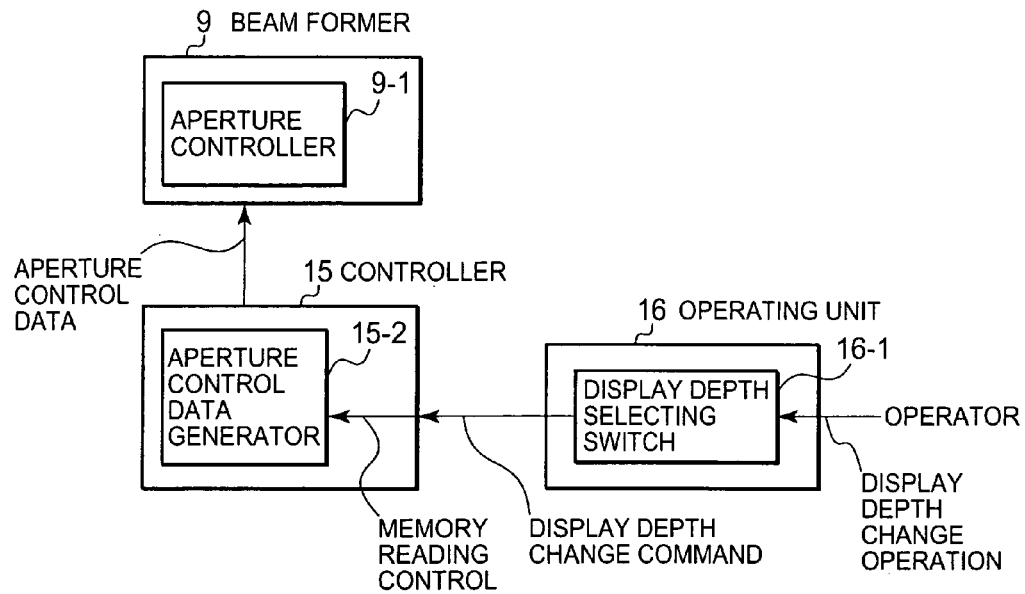
FIG. 7 is a block diagram of a control main section of the ultrasonic diagnostic apparatus in the seventh embodiment of the present invention.

FIG. 7 is a block diagram of the control main section of the ultrasonic diagnostic apparatus in the seventh embodiment of the present invention. In FIG. 7, the beam former 9 is the unit for delaying and adding the received data which is digitally converted. An aperture controller 9-1 is a unit for changing the addition pattern of the received signals in the beam former and consequently changing the size of the aperture of the probe and the like. The controller 15 is the unit for controlling the respective units of the ultrasonic diagnostic apparatus. An aperture control data generator 15-2 is a unit for generating the addition pattern of the received signals in the beam former, on the basis of a specified aperture condition. The operating unit 16 is the inputting unit that is operated by the operator. The display depth selecting switch 16-1 is the switch for the operator to select the desirable display depth. The other basic configurations of the ultrasonic diagnostic apparatus are equal to the conventional example 2 shown in FIG. 12.

The operations of the ultrasonic diagnostic apparatus in the seventh of the present invention configured as mentioned above will be described below. In the setting of the cross point switch as explained in the first embodiment, by changing the aperture conditions such as the size of the aperture of the probe and the like, it is possible to cope with the cases that the display portions are shallow and deep.

When the operator uses the display depth selecting switch 16-1 contained in the operating unit 16 to change the display depth, the display depth change command is inputted to the controller 15. In accordance with the display depth change command, the aperture control data generator 15-2 of the controller 15 generates the data to attain the aperture condition corresponding to the specified change command. That is, so as to satisfy the aperture condition corresponding to the specified display depth, it generates the pattern data for the beam former to add the received signals. The aperture controller 9-1 sets the generated pattern data for the beam former 9, and consequently controls the aperture of the probe.

For example, if the display depth is shallow, the aperture of the probe is set to be slightly small, thereby suppressing the side lobe caused by the error of the delay time at the end of the aperture. In this way, it is possible to carry out the aperture control corresponding to the display depth, and possible to obtain the picture of the excellent image quality, independently of the display depth.

As mentioned above, in the seventh embodiment of the present invention, the ultrasonic diagnostic apparatus is designed so as to change the size of the aperture of the probe and the like, correspondingly to the display depth. Thus, it is possible to obtain the optimal image over the entire depth.

<Eighth Embodiment>

The eighth embodiment of the present invention is the ultrasonic diagnostic apparatus for changing the size of the aperture of the probe and the like, on the basis of the transmission focus position.

Figure 8:
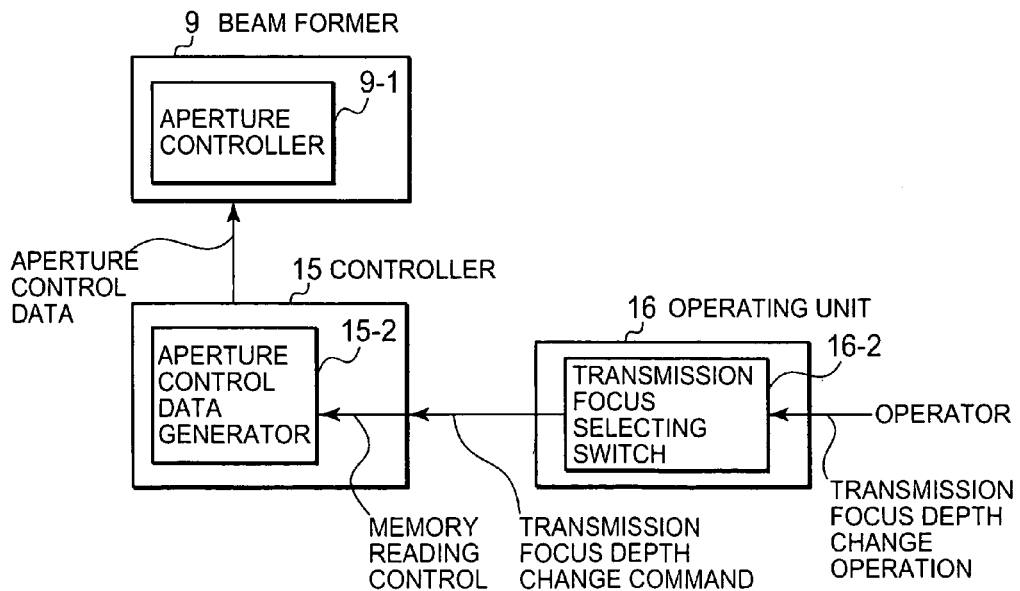
FIG. 8 is a block diagram of a control main section of the ultrasonic diagnostic apparatus in the eighth embodiment of the present invention.

FIG. 8 is a block diagram of the control main section of the ultrasonic diagnostic apparatus in the eighth embodiment of the present invention. In FIG. 8, the beam former 9 is the unit for delaying and adding the received data which are digitally converted. The aperture controller 9-1 is the unit for changing the addition pattern of the received signals in the beam former and consequently changing the size of the aperture of the probe and the like. The controller 15 is the unit for controlling the respective units of the ultrasonic diagnostic apparatus. The aperture control data generator 15-2 is the unit for generating the addition pattern of the received signals in the beam former, on the basis of the specified aperture condition. The operating unit 16 is the inputting unit that is operated by the operator. The transmission focus selecting switch 16-2 is the switch to select the adding method pattern of the received signals on the basis of the transmission focus depth. The other basic configurations of the ultrasonic diagnostic apparatus are equal to the conventional example 2 shown in FIG. 12.

The operations of the ultrasonic diagnostic apparatus in the eighth of the present invention configured as mentioned above will be described below. In the setting of the cross point switch as explained in the first embodiment, by changing the aperture conditions such as the size of the aperture of the probe and the like, it is possible to cope with the cases that the transmission focus positions are shallow and deep.

When the operator uses the transmission focus selecting switch 16-2 contained in the operating unit 16 to change the transmission focus depth, the transmission focus depth change command is inputted to the controller 15. In accordance with the transmission focus depth change command, the aperture control data generator 15-2 of the controller 15 generates the data to attain the aperture condition corresponding to the specified transmission focus depth. That is, so as to satisfy the aperture condition corresponding to the specified transmission focus depth, it generates the pattern data for the beam former to add the received signals. The aperture controller 9-1 sets the generated pattern data for the beam former 9, and consequently controls the aperture of the probe.

For example, if the focus position is deep, the aperture of the probe is set to be slightly small, thereby suppressing the side lobe caused by the error of the delay time at the end of the aperture. In this way, it is possible to carry out the aperture control corresponding to the transmission focus depth, and possible to obtain the picture of the excellent image quality, independently of the transmission focus position.

As mentioned above, in the eighth embodiment of the present invention, the ultrasonic diagnostic apparatus is designed so as to change the size of the aperture of the probe and the like, correspondingly to the transmission focus position. Thus, it is possible to obtain the optimal image over the entire depth of the transmission focus.

<Ninth Embodiment>

The ninth embodiment of the present invention is the ultrasonic diagnostic apparatus, in which the amplification factor of the received signals remaining in the part after the received signals are removed at both the ends of the aperture of the probe is increased.

Figure 9A:
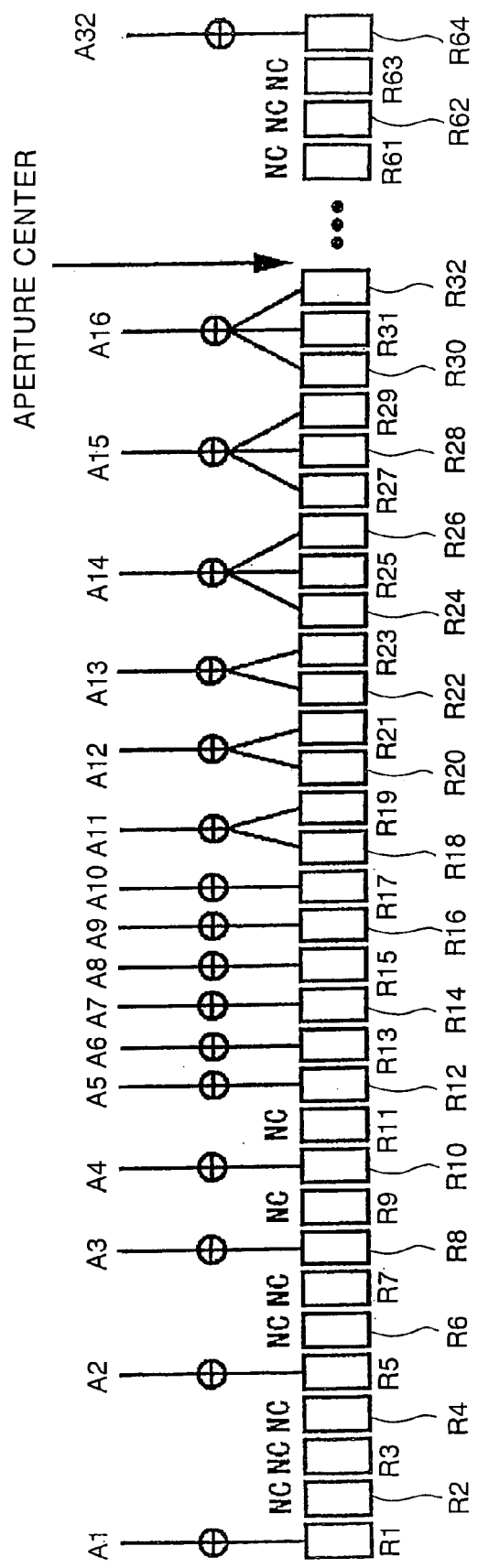
FIG. 9A is an explanation view showing a method of adding received signals by using a cross point switch, in an ultrasonic diagnostic apparatus in a ninth embodiment of the present invention.
Figure 9B:
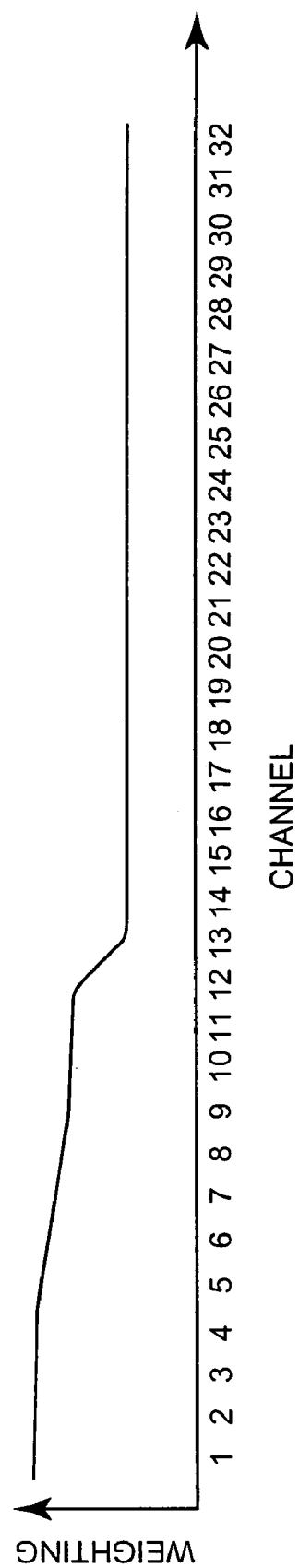
FIG. 9B is an explanation view showing a weighting in the ultrasonic diagnostic apparatus in the ninth embodiment of the present invention.

FIG. 9A and FIG. 9B are an explanation view showing a method of adding the received signals by using the cross point switch and an explanation view showing a weighting, respectively in the ultrasonic diagnostic apparatus in the ninth embodiment of the present invention. FIG. 9A is a setting view of the cross point switch indicating the adding method of the received signals. The meanings or the symbols in FIG. 9A are equal to FIG. 1. FIG. 9B is a graph showing the relation between an aperture position and an amplification gain.

The operations of the ultrasonic diagnostic apparatus in the ninth embodiment of the present invention configured as mentioned above will be described below. In the setting of the cross point switch explained in the first embodiment, the unused transducer elements exist at both the ends of the aperture of the probe, which cause the drop in the sensibility of the end. In order to compensate it, the amplification gain of the signal of the end is increased. Consequently, the excellent beam shape can be attained.

As indicated in the graph of the aperture position and amplification gain shown in FIG. 9B, at both the ends of the aperture of the probe, as the frequency of the unused transducer elements is increased, the gain is made higher, and the amplification gain is made lower, at the portion in which all transducer elements in the central portion are used. Consequently, the beam shape can be made sharper, thereby obtaining the picture of the excellent image quality.

As mentioned above, in the ninth embodiment of the present invention, the ultrasonic diagnostic apparatus is designed such that the amplification factor of the received signals remaining in the part after the received signals are removed at both the ends of the aperture of the probe is increased. Thus, the beam shape of the received signal can be made sharper.

<Tenth Embodiment>

The tenth embodiment of the present invention is the ultrasonic diagnostic apparatus, in which in order to separate between the peak position of the side lobe of a transmission beam and the peak position of the side lobe of a received beam, at a time of transmission, two channels adjacent to each other are driven by the same driving circuit.

Figure 10A:
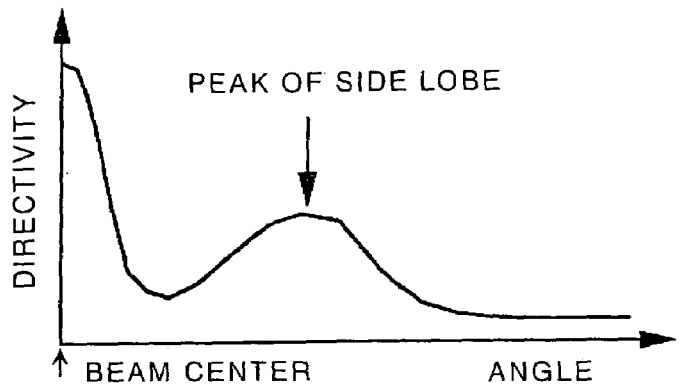
FIG. 10A is an explanation view showing a beam shape of a transmission of an ultrasonic diagnostic apparatus in a tenth embodiment of the present invention.
Figure 10B:
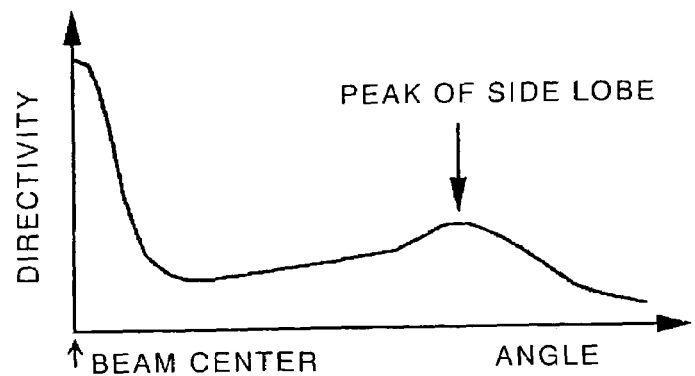
FIG. 10B is an explanation view showing a received beam shape of the ultrasonic diagnostic apparatus in the tenth embodiment of the present invention.
Figure 10C:
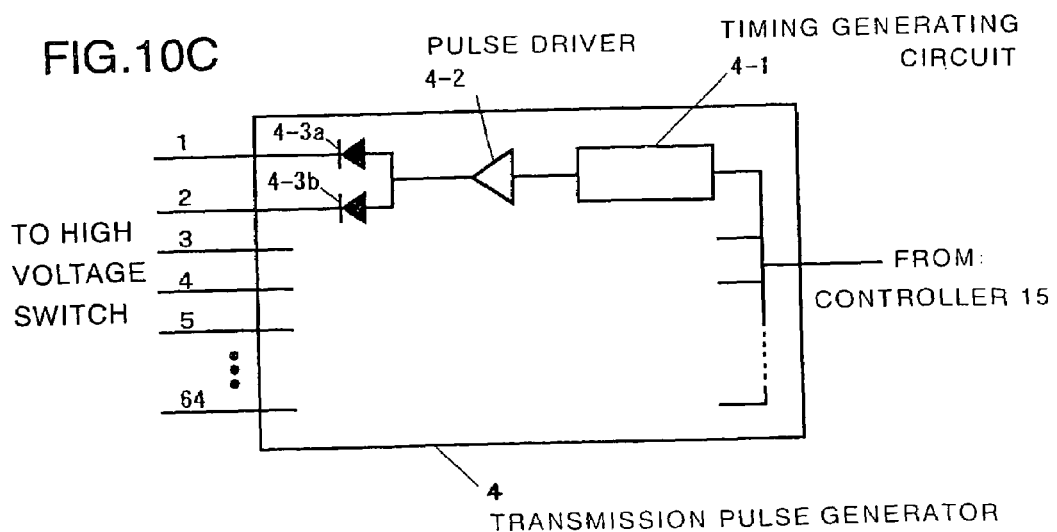
FIG. 10C is a block diagram of a transmitting circuit main section of the ultrasonic diagnostic apparatus in the tenth embodiment of the present invention.
Figure 13A:
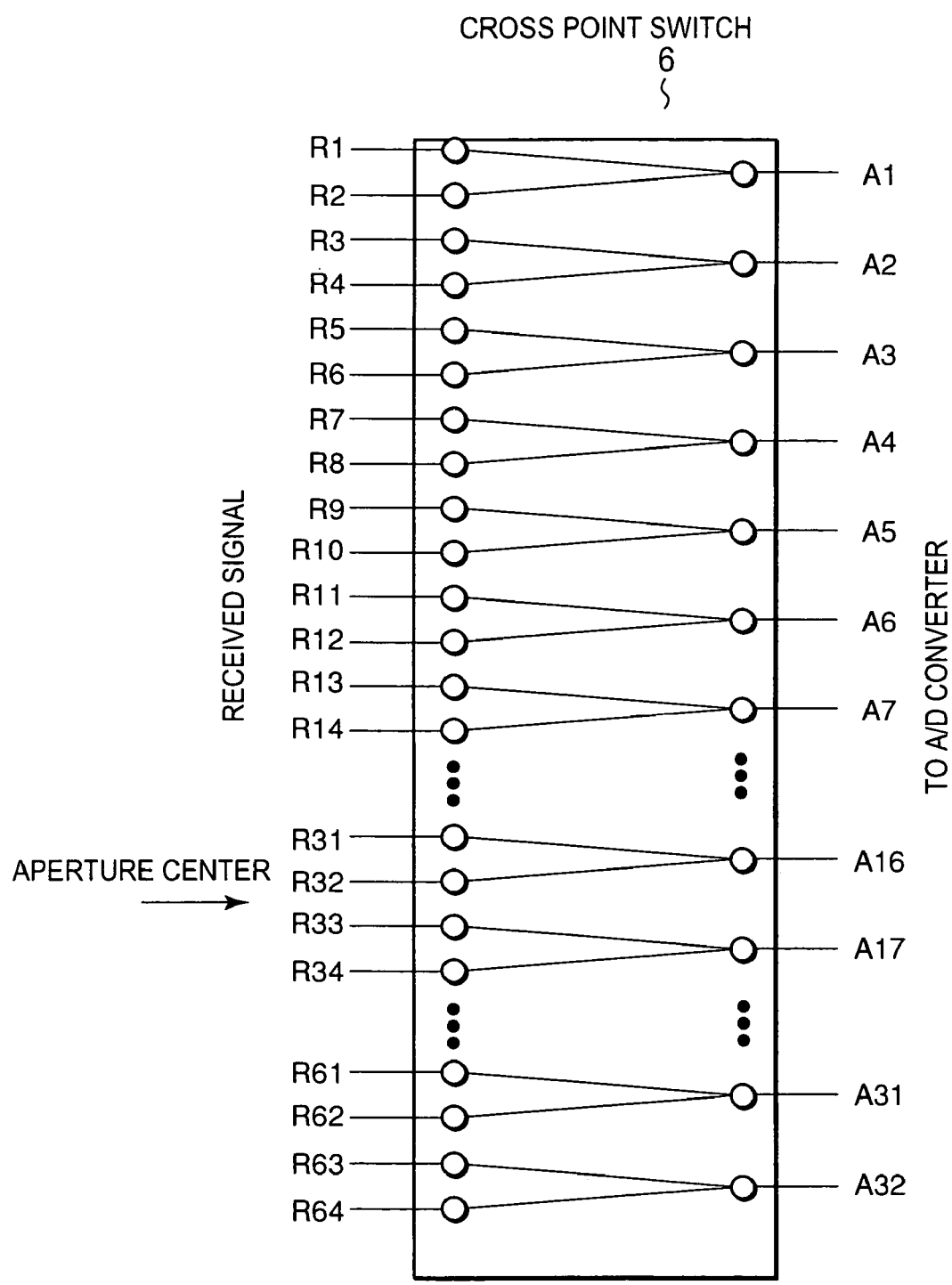
FIG. 13A and FIG. 13B are explanation views showing a method of adding received signals by using a cross point switch, in the ultrasonic diagnostic apparatus (the conventional example 2) for carrying out the conventional sector scan.
Figure 13B:
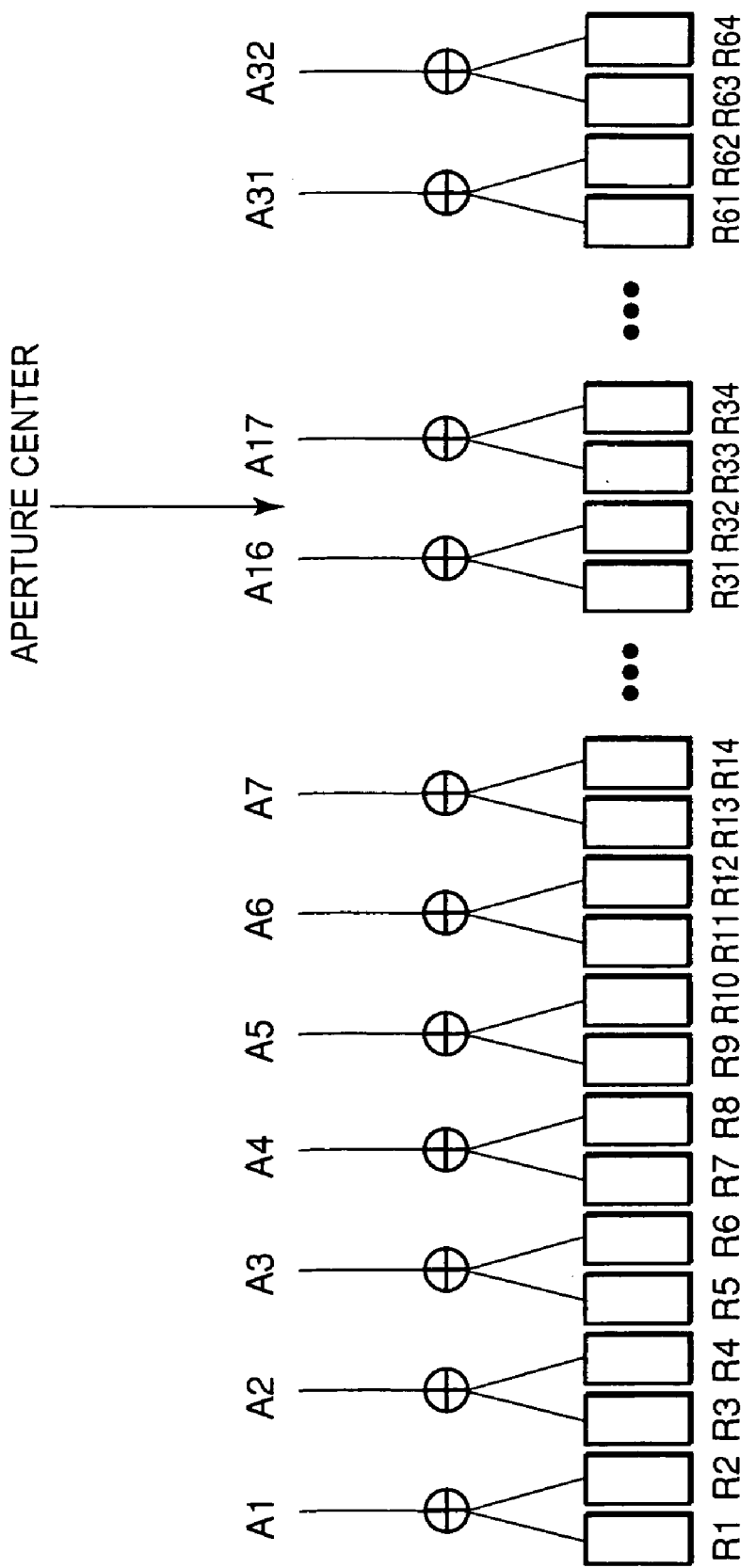

FIG. 10A, FIG. 10B and FIG. 10C are explanation views showing the beam shapes of transmission and reception and a block diagram of a transmitting circuit main section, respectively, in the ultrasonic diagnostic apparatus in the tenth embodiment of the present invention. FIG. 10A is a graph showing the shape of the transmission beam. FIG. 10B is a graph showing the shape of the received beam. FIG. 10C is a block diagram of the transmitting circuit main section. In FIG. 10C, a transmission pulse generator 4 is a unit for generating a transmission pulse. A timing generating circuit 4-1 is a circuit for controlling the generation timing of the transmission pulse. A pulse driver 4-2 is a circuit for power-amplifying the transmission pulse and vibrating the transducer element. Diodes 4-3a and 4-3b are backflow protecting devices for applying drive pulses to the transducer elements. The other basic configurations of the ultrasonic diagnostic apparatus are equal to the conventional example 2 shown in FIG. 12.

The operations of the ultrasonic diagnostic apparatus in the tenth embodiment of the present invention configured as mentioned above will be described below. As disclosed in Japanese Laid Open Patent Application (JP-A 2000-152937), a method is known in which transducer elements adjacent to each other are driven by the same transmission pulse generator. In this method, since the two transducer elements adjacent to each other are driven by one transmission pulse generator, the beam shape is indicated by the graph shown in FIG. 10A. On the contrary, in the setting of the cross point switch explained in the first embodiment, the beam shape is indicated by the graph shown in FIG. 10B, and the positions of the side lobes are different.

This fact can be used to reduce the side lobe in the received signal. At the time of the transmission, the circuit shown in FIG. 10C is used to drive the transducer elements, two at a time. At the time of the reception, the connecting method of the cross point switch explained in the first embodiment is used to process the received signal. By making the positions of the side lobes different between the transmission and the reception, as the total result of the transmission and reception, the excellent beam shape in which the side lobes are few can be attained. Consequently, while the device amount in the transmitting/receiving circuit is reduced, the picture with the excellent image quality can be obtained.

As mentioned above, in the tenth embodiment of the present invention, the ultrasonic diagnostic apparatus is designed such that in order to separate between the peak position of the side lobe in the transmission beam and the peak position of the side lobe in the received beam, at the time of the transmission, the two channels adjacent to each other are driven by the same driving circuit. Thus, it is possible to obtain the received signal in which the side lobes are few.

INDUSTRIAL APPLICABILITY

As can be understood from the above-mentioned explanations, in the present invention, the ultrasonic diagnostic apparatus is designed so as to include: the plurality of transducer elements arrayed as the ultrasonic probe; the plurality of transmission driving circuits for driving the transducer elements; the beam former for delaying and adding the signals received by the transducer elements; the cross point switch for distributing the signals received by the transducer elements to any of the plurality of input terminals of the beam former; and the connection setting unit for setting the cross point switch so as to connect by integrating the received signals of the plurality of transducer elements near the center of the aperture of the ultrasonic probe and inputting to one terminal of the beam former and so as not to connect at least one of the transducer elements at the end of the aperture to the beam former. Thus, it is possible to improve the delay precision of the received ultrasonic signals, and possible to make the beam shape sharper, and consequently possible to obtain the effect of enabling the improvement of the image quality of the ultrasonic image.

The invention claimed is:

1. An ultrasonic diagnostic apparatus including: a plurality of transducer elements arrayed as an ultrasonic probe; a plurality of transmission driving circuits for driving said transducer elements; a beam former for delaying and adding signals received by said transducer elements; a cross point switch for distributing the signals received by said transducer elements to any of a plurality of input terminals of said beam former; and a connection setting unit for setting said cross point switch so as to connect by integrating the received signals of said plurality of transducer elements near a center of an aperture of said ultrasonic probe and inputting to one terminal of said beam former and so as not to connect at least one of the transducer elements at an end of said aperture to said beam former, wherein said connection setting unit includes: a unit for storing two or more connection pattern data between said transducer element and said beam former; a unit for an operator to select a display depth; a unit for selecting one of said connection pattern data in accordance with the display depth selected by said operator; and a unit for setting said cross point switch in accordance with the selected connection pattern data, and wherein one of said plurality of connection pattern data is selected such that a beam shape at said selected display depth becomes optimal.

2. The ultrasonic diagnostic apparatus according to claim 1, wherein said connection setting unit includes: a unit for storing two or more connection pattern data between said transducer element and said beam former; a unit for selecting a display mode; a unit for selecting one of said connection pattern data in accordance with the selected display mode; and a unit for setting said cross point switch in accordance with the selected connection pattern data, and wherein one of said plurality of connection pattern data is selected such that a condition required by the mode, which includes a beam shape and a sensibility in said selected display mode, becomes optimal.

3. The ultrasonic diagnostic apparatus according to claim 1, wherein said connection setting unit includes: a unit for storing two or more connection pattern data between said transducer element and said beam former; a unit for selecting a main/side lobe property; a unit for selecting one of said connection pattern data in accordance with the selected main/side lobe property; and a unit for setting said cross point switch in accordance with the selected connection pattern data.

4. The ultrasonic diagnostic apparatus according to claim 1, including a unit for selecting a display depth, and a unit for changing a size of said aperture correspondingly to selected said display depth, wherein an aperture size is calculated so as to become optimal at selected said display depth, and a control is carried out.

5. The ultrasonic diagnostic apparatus according to claim 1, including a unit for selecting a transmission focus position, and a unit for changing a size of said aperture correspondingly to selected said transmission focus position, wherein an aperture size is calculated so as to become optimal at selected said transmission focus position, and a control is carried out.

6. The ultrasonic diagnostic apparatus according to claim 1, wherein at an end of said aperture, a unit for increasing an amplification factor of a signal of a transducer element adjacent to a transducer element which is not connected to said beam former is installed, and when an aperture is divided into a plurality of apertures, received signal magnitudes at the respective apertures are constant.

* * * * *